(12) United States Patent
Youn et al.

(10) Patent No.: US 12,120,558 B2
(45) Date of Patent: Oct. 15, 2024

(54) METHOD FOR MOVING PDU SESSION ON NON-3GPP TO 3GPP ACCESS

(71) Applicant: LG ELECTRONICS INC., Seoul (KR)

(72) Inventors: Myungjune Youn, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 17/642,899

(22) PCT Filed: Sep. 11, 2020

(86) PCT No.: PCT/KR2020/012309
§ 371 (c)(1),
(2) Date: Mar. 14, 2022

(87) PCT Pub. No.: WO2021/066346
PCT Pub. Date: Apr. 8, 2021

(65) Prior Publication Data
US 2022/0361054 A1 Nov. 10, 2022

(30) Foreign Application Priority Data
Oct. 2, 2019 (KR) .................. 10-2019-0122515

(51) Int. Cl.
*H04W 36/00* (2009.01)
*H04W 36/32* (2009.01)
(Continued)

(52) U.S. Cl.
CPC ... *H04W 36/0022* (2013.01); *H04W 36/0033* (2013.01); *H04W 36/0079* (2018.08); *H04W 36/00837* (2018.08); *H04W 36/32* (2013.01)

(58) Field of Classification Search
CPC ......... H04W 36/0022; H04W 36/0033; H04W 36/0079; H04W 36/00837; H04W 36/32;
(Continued)

(56) References Cited

U.S. PATENT DOCUMENTS 9,131,427 B2 * 9/2015 Wu ..................... H04W 48/04
10,419,979 B2 * 9/2019 Youn ..................... H04W 36/00
(Continued)

FOREIGN PATENT DOCUMENTS

CN 108702724 10/2018
CN 109219092 B * 1/2021 ........ H04W 36/0011
(Continued)

OTHER PUBLICATIONS

ZTE, "MA PDU Session Release", C4-192126, 3GPP TSG-CT WG4 Meeting #91, Reno, US, May 2, 2019, See pp. 3 and 18.
(Continued)

*Primary Examiner* — Ahmed Elallam
(74) *Attorney, Agent, or Firm* — BRYAN CAVE LEIGHTON PAISNER LLP

(57) ABSTRACT

In the present specification, provided is an operation method for an access and mobility management function (AMF). The method comprises a step of receiving a session management (SM) context state notification message from a session management function (SMF). The SM context state notification message can be received on the basis of the failure of a protocol data unit (PDU) session establishment procedure. The PDU session establishment procedure can be triggered for a handover of a PDU session between non-3rd generation partnership project (non-3GPP) access and 3GPP access. The method includes a step of updating an access type related to the PDU session on the basis of the SM context state notification message.

13 Claims, 25 Drawing Sheets

(51) Int. Cl.
  *H04W 76/18* (2018.01)
  *H04W 36/14* (2009.01)

(58) Field of Classification Search
  CPC . H04W 36/12; H04W 76/18; H04W 36/0055; H04W 36/14
  See application file for complete search history.

(56) References Cited

U.S. PATENT DOCUMENTS

| | | | |
|---|---|---|---|
| 11,445,556 B2* | 9/2022 | Lu | H04W 4/12 |
| 2011/0116477 A1 | 5/2011 | Wu | |
| 2018/0352483 A1 | 12/2018 | Youn et al. | |
| 2019/0261260 A1 | 8/2019 | Dao et al. | |
| 2020/0275511 A1* | 8/2020 | Liu | H04W 8/08 |

FOREIGN PATENT DOCUMENTS

| | | | | |
|---|---|---|---|---|
| EP | 3477993 B1 * | 9/2021 | | H04L 63/0272 |
| KR | 1020180137823 A1 | 12/2018 | | |
| KR | 20190008381 A | 1/2019 | | |
| KR | 1020190020142 A | 2/2019 | | |

OTHER PUBLICATIONS

Nokia, "Insertion Of a PSA and UL CL/BP Into The Data Path of a PDU Session With an I-SMF", C4-193082, 3GPP TSG-CT WG4 Meeting #93, Wroclaw, Poland, Aug. 16, 2019, See pp. 1-19.

Nokia, Nokia Shanghai Bell, "URIs of created SM context and PDU session resources," 3GPP TSG CT WG4 Meeting #86, C4-186540, Jul. 31, 2018.

"3rd Generation Partnership Project; Technical Specification Group Services and System Aspects; Procedures for the 5G System (5GS); Stage 2 (Release 16)", 3GPP TS 23.502 V16.2.0, Sep. 24, 2019, XP051784671.

LG Electronics, "Discussion on handover failure between 3GPP and non-3GPP accesses", 3GPP TSG-SA2 Meeting #135, Oct. 14-18, 2019, S2-1909613.

LG Electronics, "Clarification on handover failure between 3GPP and non-3GPP accesses", 3GPP TSG-SA2 Meeting #135, Oct. 14-18, 2019, S2-1909614.

* cited by examiner

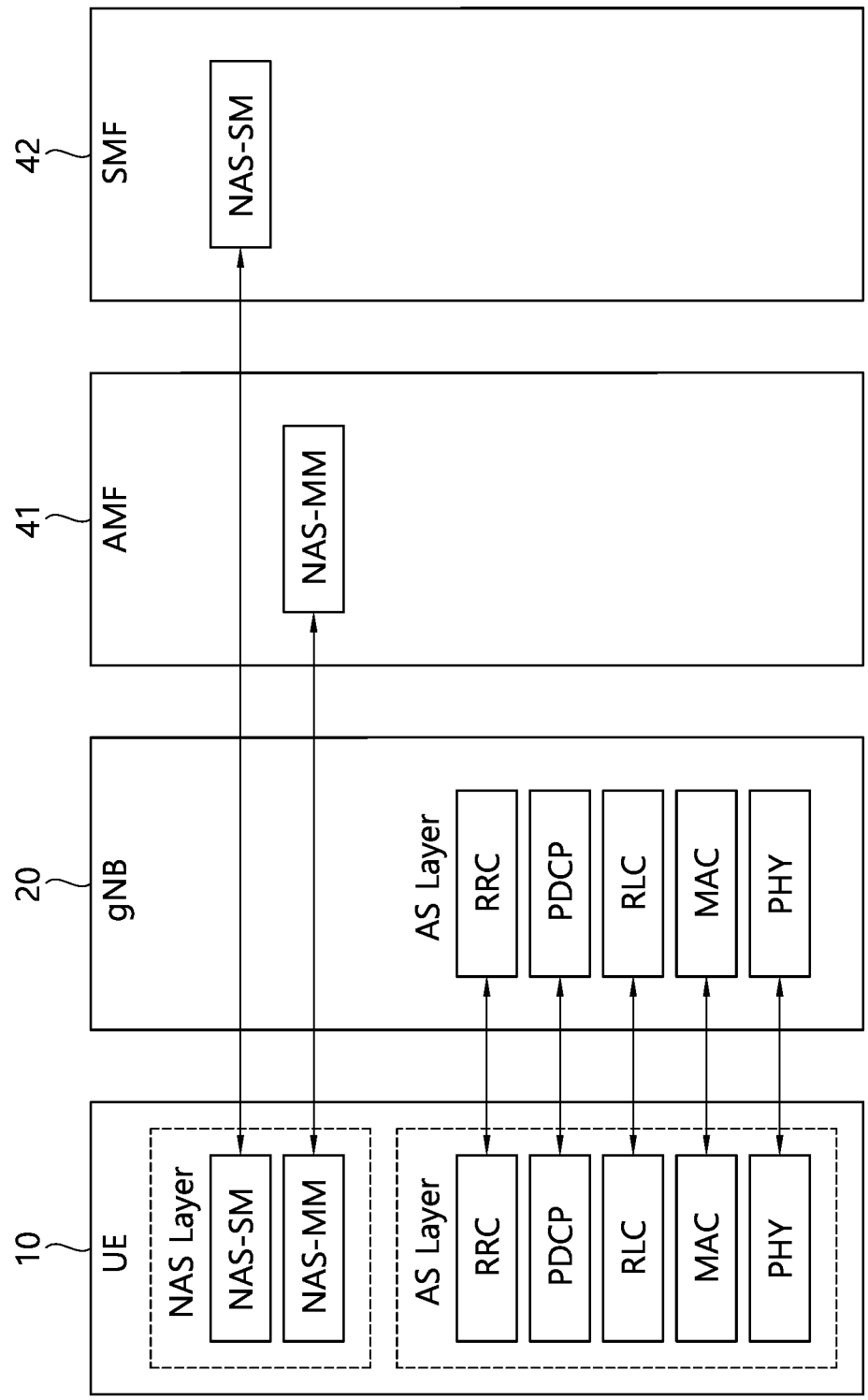

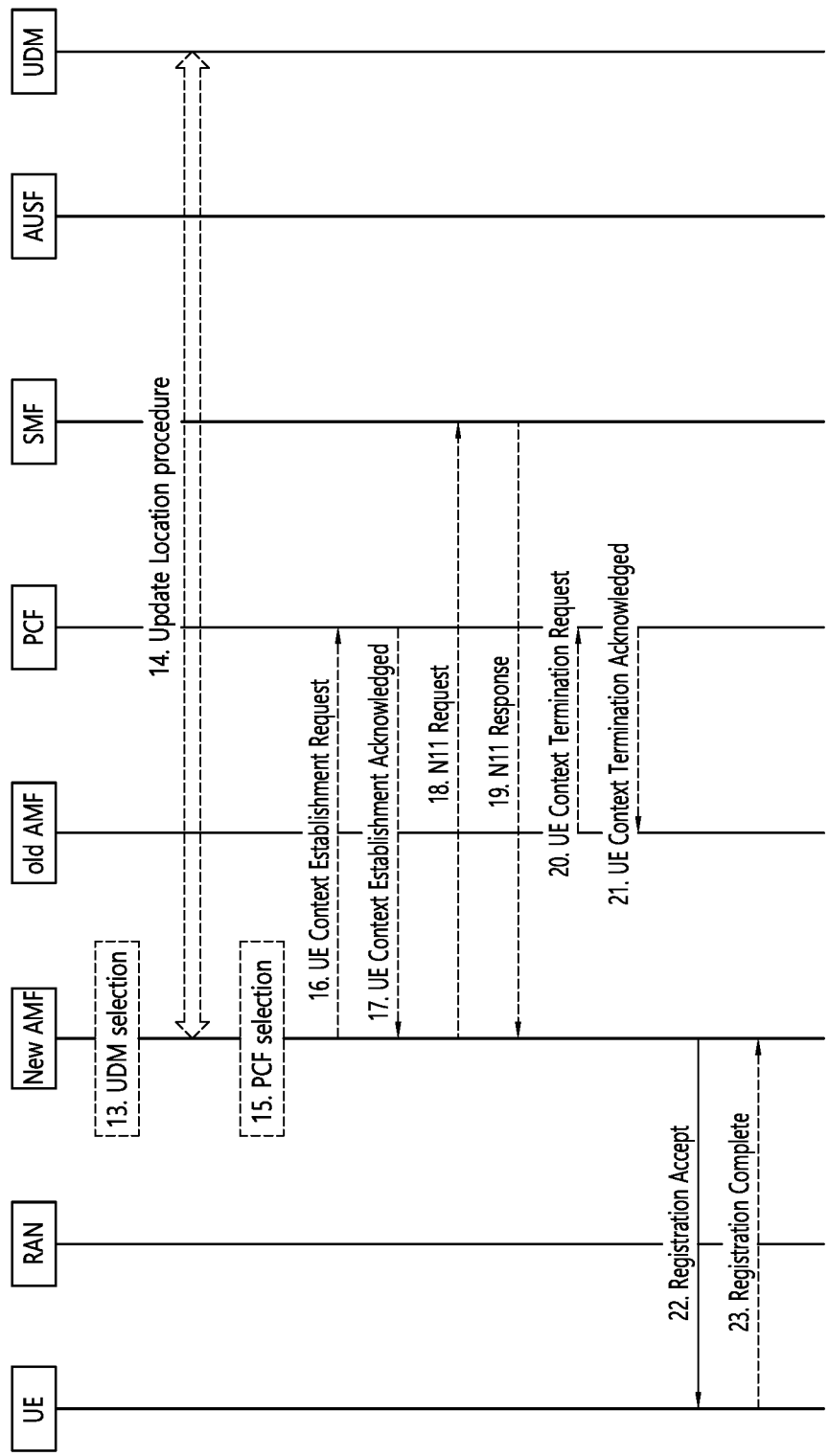

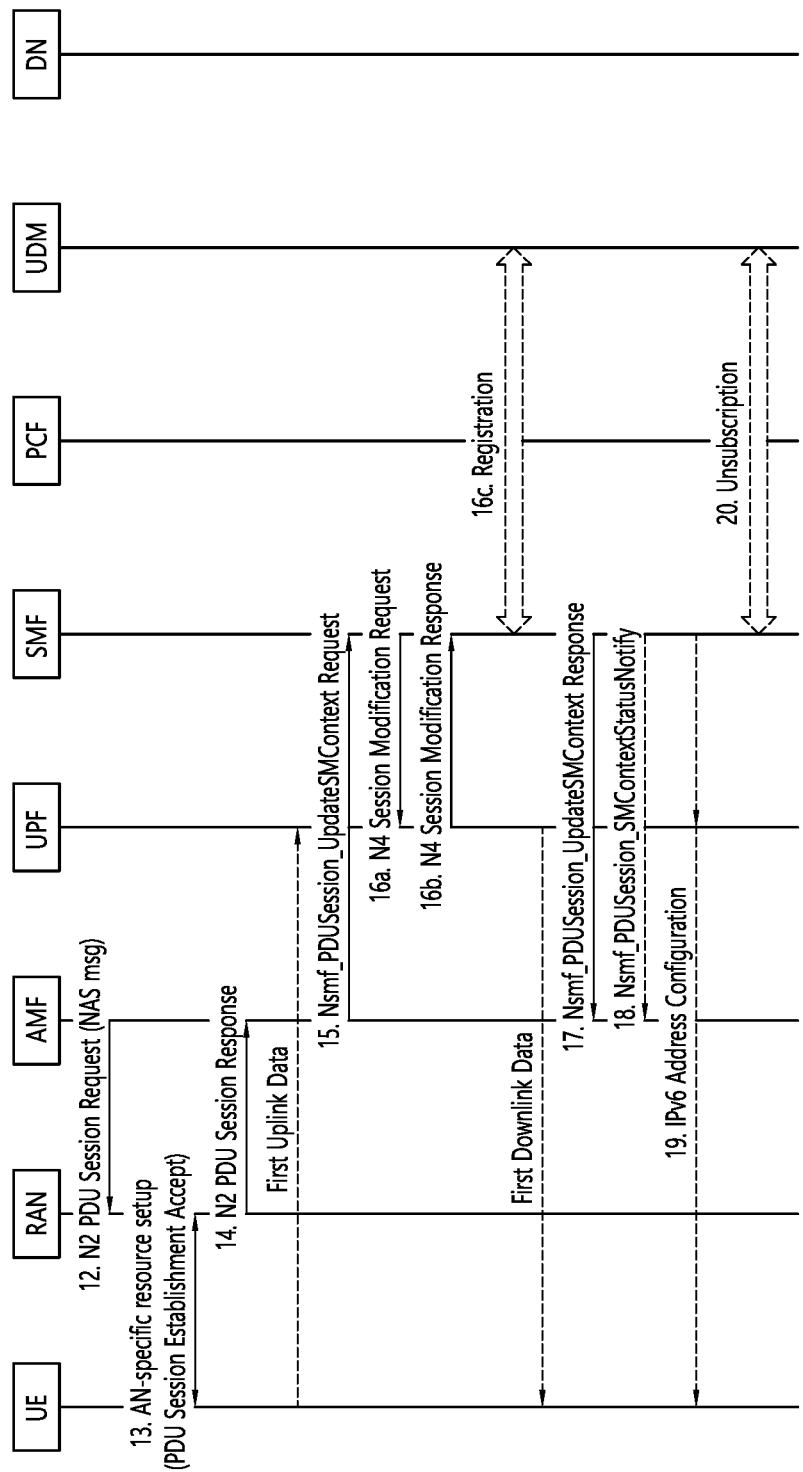

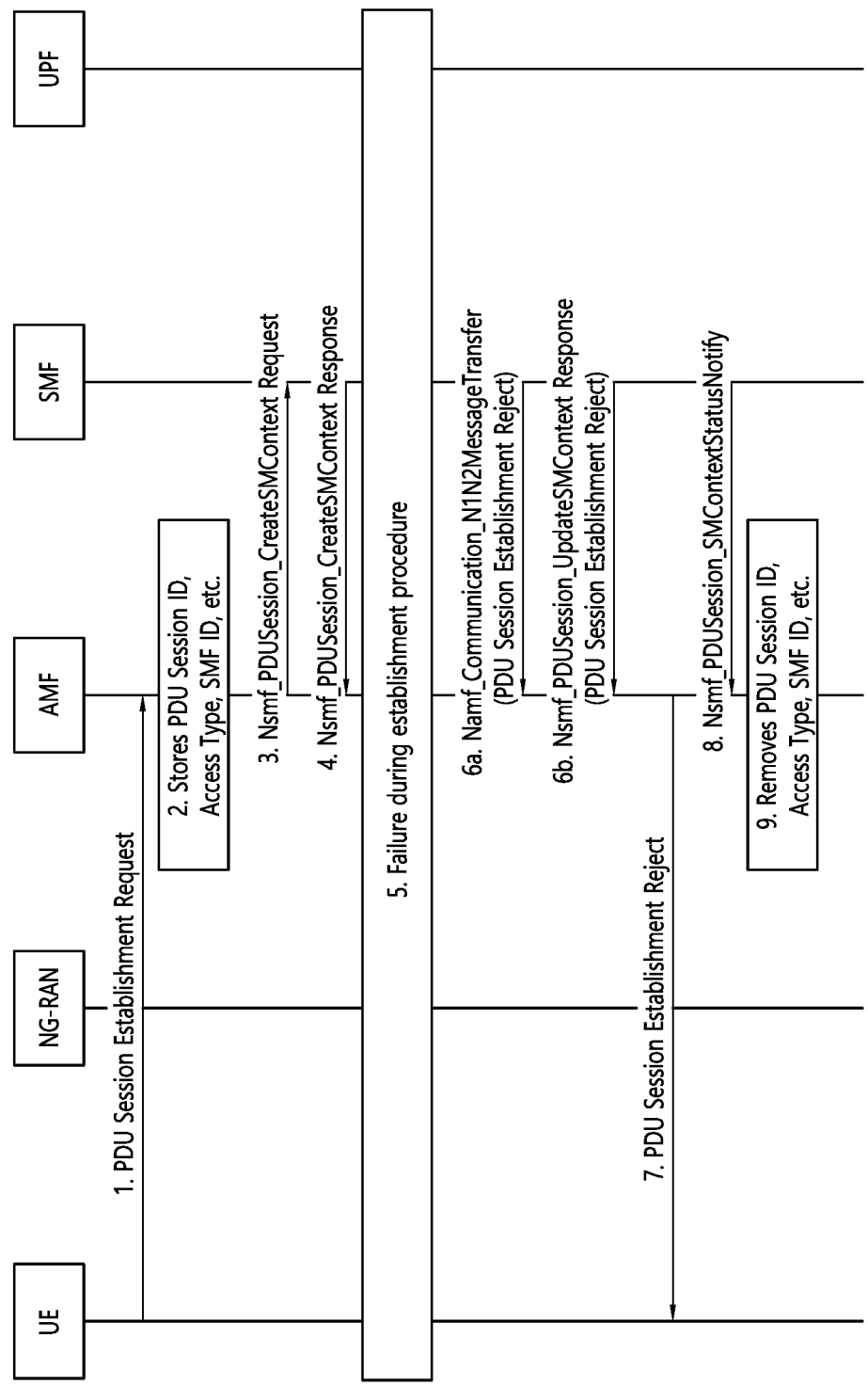

METHOD FOR MOVING PDU SESSION ON NON-3GPP TO 3GPP ACCESS

CROSS-REFERENCE TO RELATED APPLICATIONS

This application is the National Stage filing under 35 U.S.C. § 371 of International Application No. PCT/KR2020/012309, filed on Sep. 11, 2020, which claims the benefit of Korean Patent Application No. 10-2019-0122515, filed on Oct. 2, 2019, the contents of which are all hereby incorporated by reference herein in their entirety.

TECHNICAL FIELD

The present specification relates to mobile communications.

BACKGROUND

FIG. 1 shows a structure of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (Evolved Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM)/Enhanced Data rates for Global Evolution (EDGE) Radio Access Network (GERAN)).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an untrusted network, such as an Interworking Wireless Local Area Network (I-WLAN), a trusted network, such as a Code Division Multiple Access (CDMA)).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a UE to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point that provides related control and mobility support between trusted non-3GPP access and PDN GWs to the user plane. S2b is a reference point that provides related control and mobility support between ePDG and P-GW to the user plane.

With the success of Long-Term Evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The fifth-generation mobile communication supports multiples numerologies (and/or multiple Subcarrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

NR frequency band is defined as a frequency range of two types, i.e., FR1, FR2. FR1 is 410 MHz-7125 MHz, and FR2 is 24250 MHz-52600 MHz, meaning millimeter wave (mmW).

For convenience of explanation, among the frequency ranges used in the NR system, FR1 may mean "sub 6 GHz range". FR2 may mean "above 6 GHz range", and may be referred to as millimeter Wave (mmW).

TABLE 2

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 3 below. That is, FR1 may include a frequency band of above 6 GHz (or, 5850, 5900, 5925 MHz, etc.). For example, a frequency band of above 6 GHz (or, 5850, 5900, 5925 MHz, etc.) included in FR1 may include an unlicensed band. The unlicensed band may be used for various purposes, e.g., for communication for a vehicle (e.g., autonomous driving).

TABLE 3

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

The ITU suggests three usage scenarios, e.g., enhanced Mobile Broadband (eMBB), massive Machine Type Communication (mMTC), and Ultra-Reliable and Low Latency Communications (URLLC).

URLLC relates to a usage scenario in which high reliability and low delay time are required. For example, services like autonomous driving, automation, and virtual realities requires high reliability and low delay time (e.g., 1 ms or less). A delay time of the current 4G (LTE) is statistically 21-43 ms (best 10%), 33-75 ms (median). Thus, the current 4G (LTE) is not sufficient to support a service requiring a delay time of 1 ms or less.

Next, the eMBB relates to a usage scenario that requires a mobile ultra-wideband.

These ultra-wideband high-speed services seem to be difficult to accommodate by existing core networks designed for LTE/LTE-A.

Therefore, the redesign of core networks is urgently needed in so-called fifth-generation mobile communications.

FIG. 2 is a structural diagram of a next-generation mobile communication network.

The 5G Core network (5GC) may include various components, part of which are shown in FIG. 2, including an Access and mobility Management Function (AMF) 41, a Session Management Function (SMF) 42, a Policy Control Function (PCF) 43, a User Plane Function (UPF) 44, an Application Function (AF) 45, a Unified Data Management (UDM) 46 and a Non-3GPP Interworking Function (N3IWF) 49.

UE 10 is connected to a data network via the UPF 44 through a Next Generation Radio Access Network (NG-RAN), i.e., gNB or base station.

The UE 10 may be provided with a data service even through untrusted non-3GPP access, e.g., a Wireless Local Area Network (WLAN). In order to connect the non-3GPP access to a core network, the N3IWF 59 may be deployed.

FIG. 3 is an exemplary diagram illustrating a predicted structure of a next generation mobile communication in terms of a node.

Referring to FIG. 3, the UE is connected to a Data Network (DN) through a NG-RAN.

The Control Plane Function (CPF) node as shown may perform all or part of the Mobility Management Entity (MME) function of the fourth generation mobile communication, and all or a part of the control plane function of the Serving Gateway (S-GW) and the PDN-Gateway (P-GW) of the fourth generation mobile communication. The CPF node includes an Access and mobility Management Function (AMF) node and a Session Management Function (SMF).

The User Plane Function (UPF) node as shown is a type of a gateway over which user data is transmitted and received. The UPF node may perform all or part of the user plane functions of the S-GW and the P-GW of the fourth generation mobile communication.

The Policy Control Function (PCF) node as shown is configured to control a policy of the service provider.

The Application Function (AF) node as shown refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 3, a UE can simultaneously access two data networks using multiple Protocol Data Unit (PDU) sessions.

FIG. 4 is an exemplary diagram illustrating an architecture for supporting simultaneously access two data networks.

FIG. 4 illustrates an architecture that allows the UE to simultaneously access two data networks using one PDU session.

Reference points shown in FIGS. 3 and 4 are as follows.
N1 is a reference point between UE and AMF.
N2 is a reference point between (R)AN and AMF.
N3 is a reference point between (R)AN and UPF.
N4 is a reference point between SMF and UPF.
N5 is a reference point between PCF and AF.
N6 is a reference point between UPF and DN.
N7 is a reference point between SMF and PCF.
N8 is a reference point between UDM and AMF.

N9 is a reference point between UPFs.
N10 is a reference point between UDM and SMF.
N11 is a reference point between AMF and SMF.
N12 is a reference point between AMF and AUSF.
N13 is a reference point between UDM and AUSF.
N14 is a reference point between AMFs.
N15 is a reference point between PCF and AMF.
N16 is a reference point between SMFs.
N22 is a reference point between AMF and NSSF.

FIG. 5 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the Open System Interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a Medium Access Control (MAC) layer, a Radio Link Control (RLC) layer, and a Packet Data Convergence Protocol (PDCP) layer.

The third layer includes Radio Resource Control (hereinafter abbreviated as RRC) layer. The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The Non-Access Stratum (NAS) layer performs functions such as connection management (session management) and mobility management.

The NAS layer is divided into a NAS entity for Mobility Management (MM) and a NAS entity for Session Management (SM).

1) NAS entity for MM provides the following functions in general.
  NAS procedures related to AMF include the following.
  Registration management and access management procedures. AMF supports the following functions.
  Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
  The NAS entity for the MM creates a NAS-MM message that derives how and where to deliver an SM signaling message through a security header representing the NAS transmission of SM signaling and additional information on a received NAS-MM.
  Upon receiving SM signaling, the NAS entity for the SM performs an integrity check of the NAS-MM message, analyzes additional information, and derives a method and place to derive the SM signaling message.

Meanwhile, in FIG. 5, the RRC layer, the RLC layer, the MAC layer, and the PHY layer located below the NAS layer are collectively referred to as an Access Stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs Registration Management (RM) and Connection Management (CM) for 3GPP access as well as non-3GPP access.

On the other hand, when the UE creates a PDU session in 3GPP access or non-3GPP access and then attempts to perform handover to another access, the handover may fail if resource reservation in the access network fails.

In this case, the SMF is supposed to notify the AMF that the PDU session has been released. In this case, AMF deletes all contexts for the corresponding PDU session. In this case, there is a problem in that the UE can no longer send and receive NAS signaling for the PDU session.

SUMMARY

Accordingly, an object of the present specification is to propose a method for solving the above-described problems.

In order to solve the above-described problems, a disclosure of the present specification provides a method for operating an Access and mobility Management Function (AMF). The method may comprise receiving, from a Session Management Function (SMF), a Session Management (SM) context status notify message. The SM context status notify message may be received based on a failure of a Protocol Data Unit (PDU) session establishment procedure. The PDU session establishment procedure may be triggered for a handover of a PDU session between a non-3rd Generation Partnership Project (non-3GPP) access and a 3GPP access. The method may comprise updating an access type related to the PDU session based on the SM context status notify message.

In order to solve the above-described problems, a disclosure of the present specification provides a method for operating a Session Management Function (SMF). The method may comprise transmitting, to an Access and mobility Management Function (AMF), a Session Management (SM) context status notify message. wherein the SM context status notify message may be transmitted based on a failure of a Protocol Data Unit (PDU) session establishment procedure. The PDU session establishment procedure may be triggered for a handover of a PDU session between a non-3rd Generation Partnership Project (non-3GPP) access and a 3GPP access. The SM context status notify message may include information on an access type related to the PDU session.

In order to solve the above-described problems, a disclosure of the present specification provides a chipset mounted on an Access and mobility Management Function (AMF). The chipset may comprise at least one processor, and at least one memory for storing instructions and operably electrically connectable to the at least one processor. The instructions, based on being executed by the at least one processor, may perform comprising: receiving, from a Session Management Function (SMF), a Session Management (SM) context status notify message. The SM context status notify message may be received based on a failure of a Protocol Data Unit (PDU) session establishment procedure. The PDU session establishment procedure may be triggered for a handover of a PDU session between a non-3rd Generation Partnership Project (non-3GPP) access and a 3GPP access. The operations may comprise updating an access type related to the PDU session based on the SM context status notify message.

In order to solve the above-described problems, a disclosure of the present specification provides a device for an Access and mobility Management Function (AMF). The device may comprise a transceiver, at least one processor, and at least one memory for storing instructions and operably electrically connectable to the at least one processor. The instructions, based on being executed by the at least one processor, may perform operations comprising: receiving, from a Session Management Function (SMF), a Session Management (SM) context status notify message. The SM context status notify message may be received based on a failure of a Protocol Data Unit (PDU) session establishment procedure. The PDU session establishment procedure may be triggered for a handover of a PDU session between a non-3rd Generation Partnership Project (non-3GPP) access and a 3GPP access. The operations may comprise updating an access type related to the PDU session based on the SM context status notify message.

In order to solve the above-described problems, a disclosure of the present specification provides a non-volatile computer-readable storage medium having recorded thereon instructions. The instructions, when executed by one or more processors in a device for an Access and mobility Management Function (AMF), may cause the one or more processors to perform operation comprising: receiving, from a Session Management Function (SMF), a Session Management (SM) context status notify message. The SM context status notify message may be received based on a failure of a Protocol Data Unit (PDU) session establishment procedure. The PDU session establishment procedure may be triggered for a handover of a PDU session between a non-3rd Generation Partnership Project (non-3GPP) access and a 3GPP access. The operations may comprise updating an access type related to the PDU session based on the SM context status notify message.

In order to solve the above-described problems, a disclosure of the present specification provides a chipset mounted on a Session Management Function (SMF). The chipset may comprise at least one processor, and at least one memory for storing instructions and operably electrically connectable to the at least one processor. The instructions, based on being executed by the at least one processor, may perform operations comprising: transmitting, to an Access and mobility Management Function (AMF), a Session Management (SM) context status notify message. The SM context status notify message may be transmitted based on a failure of a Protocol Data Unit (PDU) session establishment procedure. The PDU session establishment procedure may be triggered for a handover of a PDU session between a non-3rd Generation Partnership Project (non-3GPP) access and a 3GPP access. The SM context status notify message may include information on an access type related to the PDU session.

In order to solve the above-described problems, a disclosure of the present specification provides a device for a Session Management Function (SMF). The device may comprise a transceiver, at least one processor, and at least one memory for storing instructions and operably electrically connectable to the at least one processor. The instructions, based on being executed by the at least one processor, may perform operations comprising: transmitting, to an Access and mobility Management Function (AMF), a Session Management (SM) context status notify message. The SM context status notify message may be transmitted based on a failure of a Protocol Data Unit (PDU) session establishment procedure. The PDU session establishment procedure may be triggered for a handover of a PDU session between a non-3rd Generation Partnership Project (non-3GPP) access and a 3GPP access. The SM context status notify message may include information on an access type related to the PDU session.

According to the disclosure of the present specification, it is possible to solve the problems of the prior art.

BRIEF DESCRIPTION OF THE DRAWINGS

FIG. 5 is another exemplary diagram showing a structure of a radio interface protocol between a UE and a gNB.

FIGS. 6a and 6b are a signal flowchart illustrating an exemplary registration procedure.

FIGS. 7a and 7b are a signal flowchart illustrating an exemplary PDU session establishment procedure.

FIG. 9 is an exemplary diagram illustrating an example in which establishment of a new PDU session fails.

DETAILED DESCRIPTION

Figure 1:
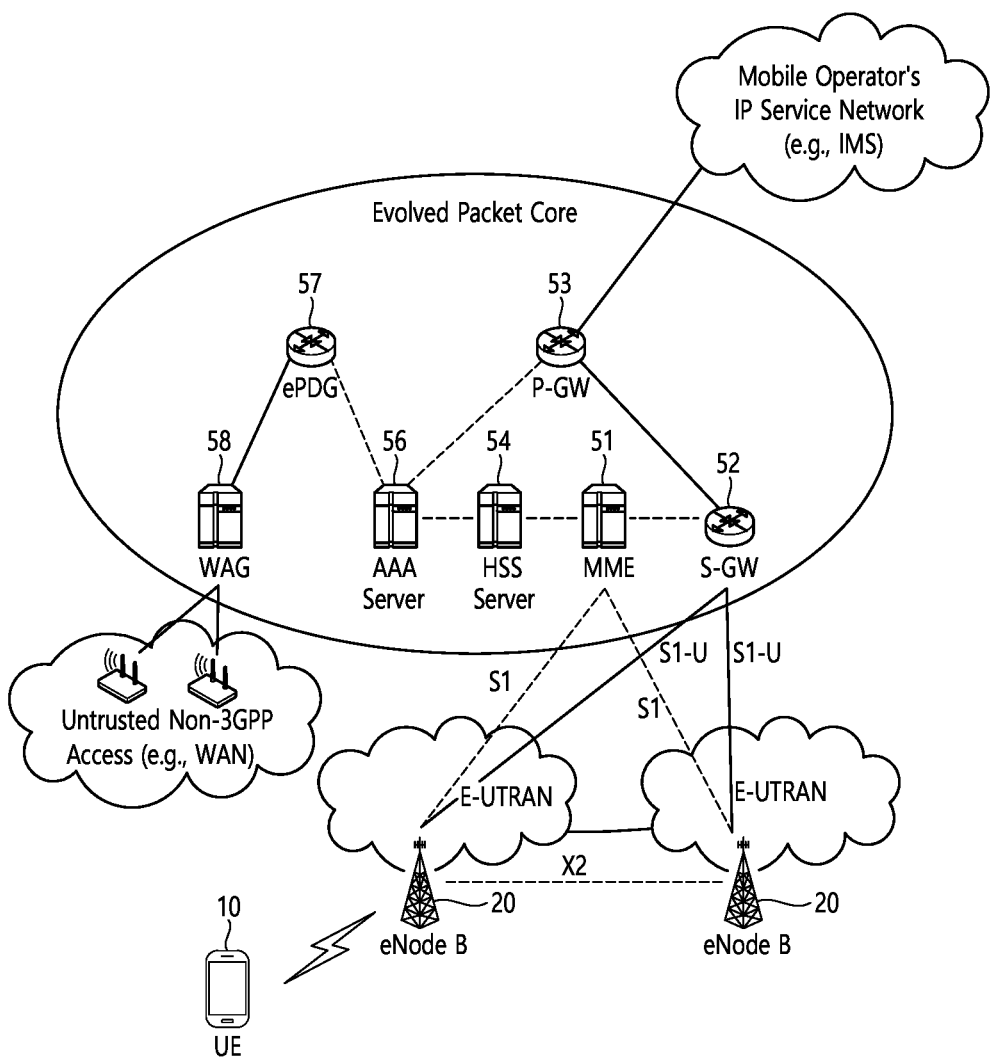
FIG. 1 shows a structure of an evolved mobile communication network.
Figure 2:
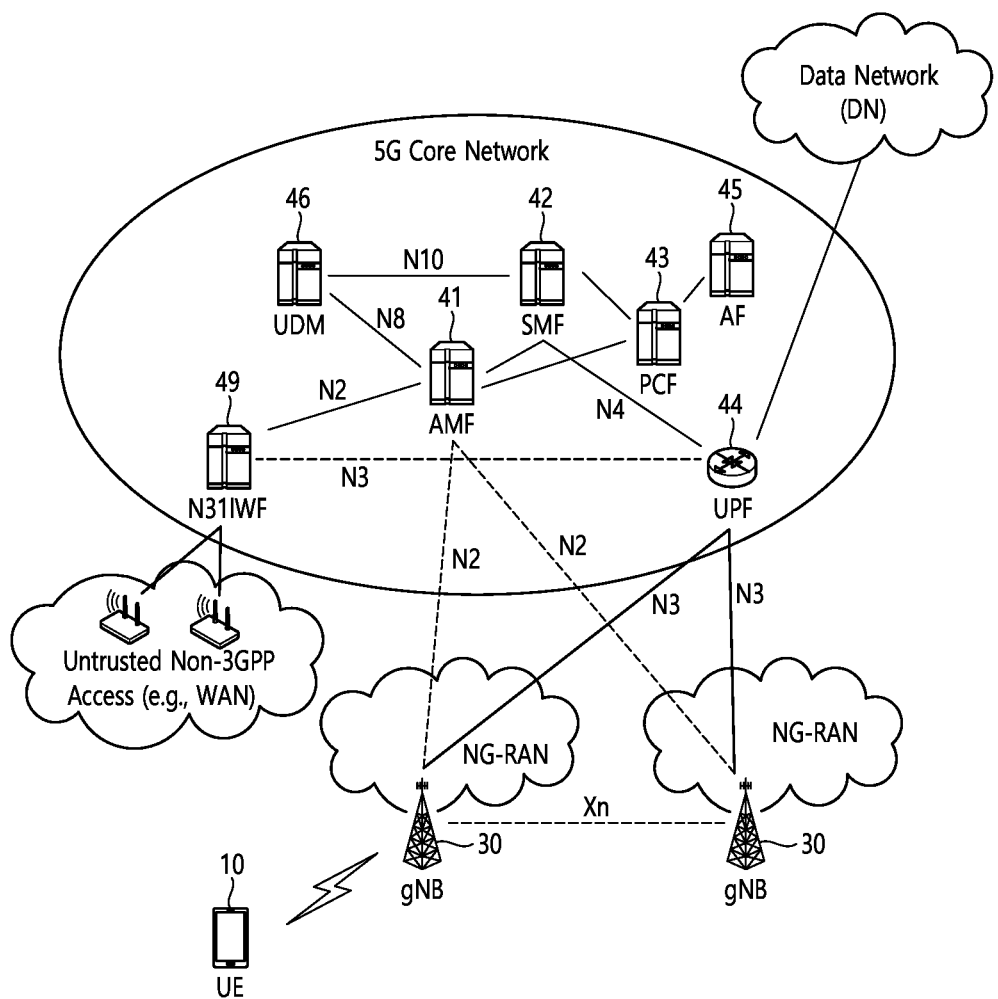
FIG. 2 is a structural diagram of a next-generation mobile communication network.
Figure 3:
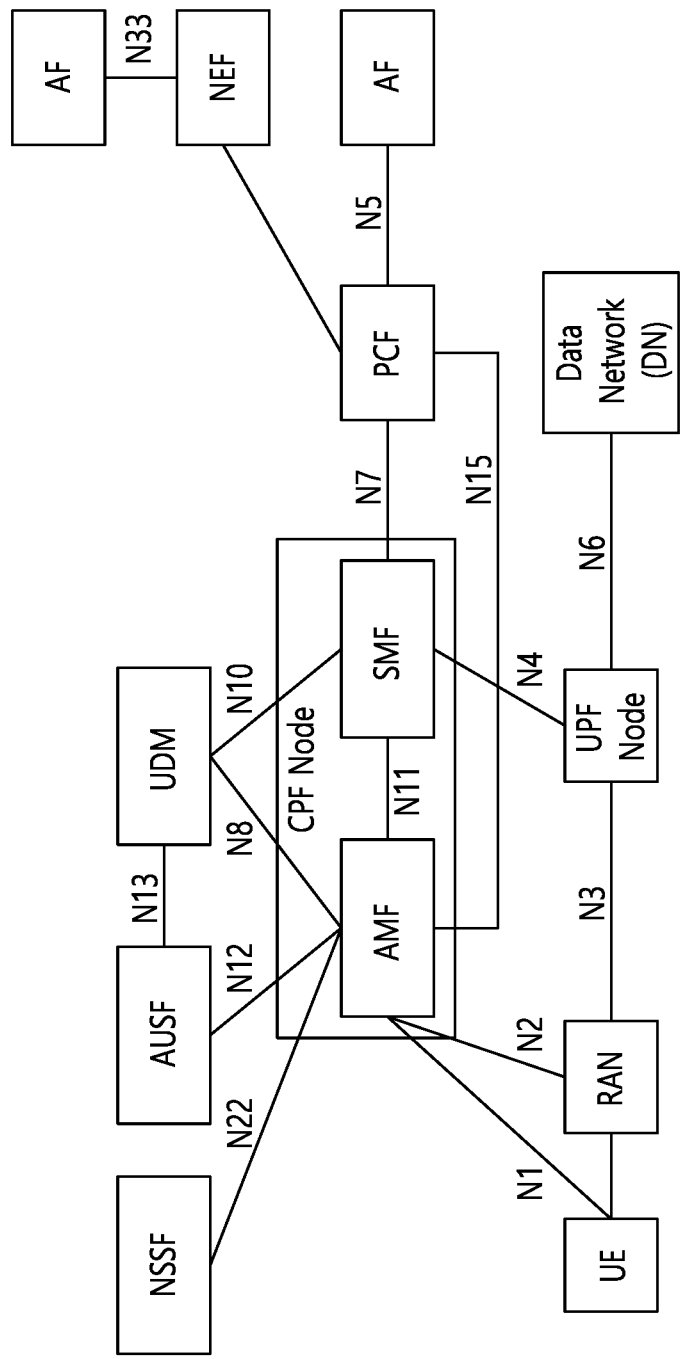
FIG. 3 is an exemplary diagram illustrating a predicted structure of a next generation mobile communication in terms of a node.
Figure 4:
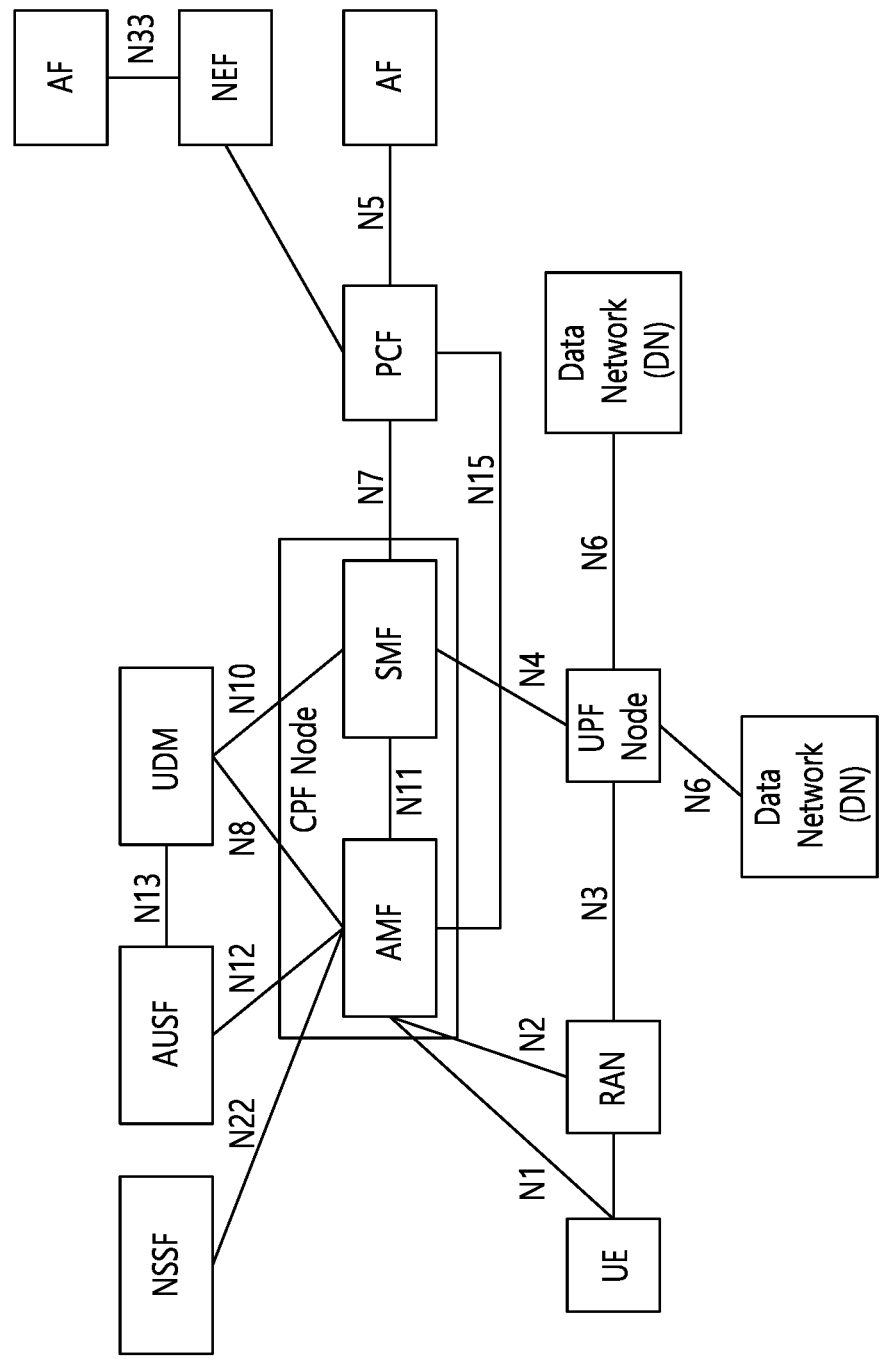
FIG. 4 is an exemplary diagram illustrating an architecture for supporting simultaneously access two data networks.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the disclosure readily understood, but not should be intended to be limiting of the disclosure. It should be understood that the disclosure may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

In the accompanying drawings, a User Equipment (UE) is illustrated by way of example, but the illustrated UE may also be referred to in terms of UE 100 (terminal), Mobile Equipment (ME), and the like. In addition, the UE may be a portable device such as a notebook computer, a mobile phone, a PDA, a smartphone, or a multimedia device or may be a non-portable device such as a PC or vehicle-mounted device.

Registration Procedure

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new Tracking Area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 6A:
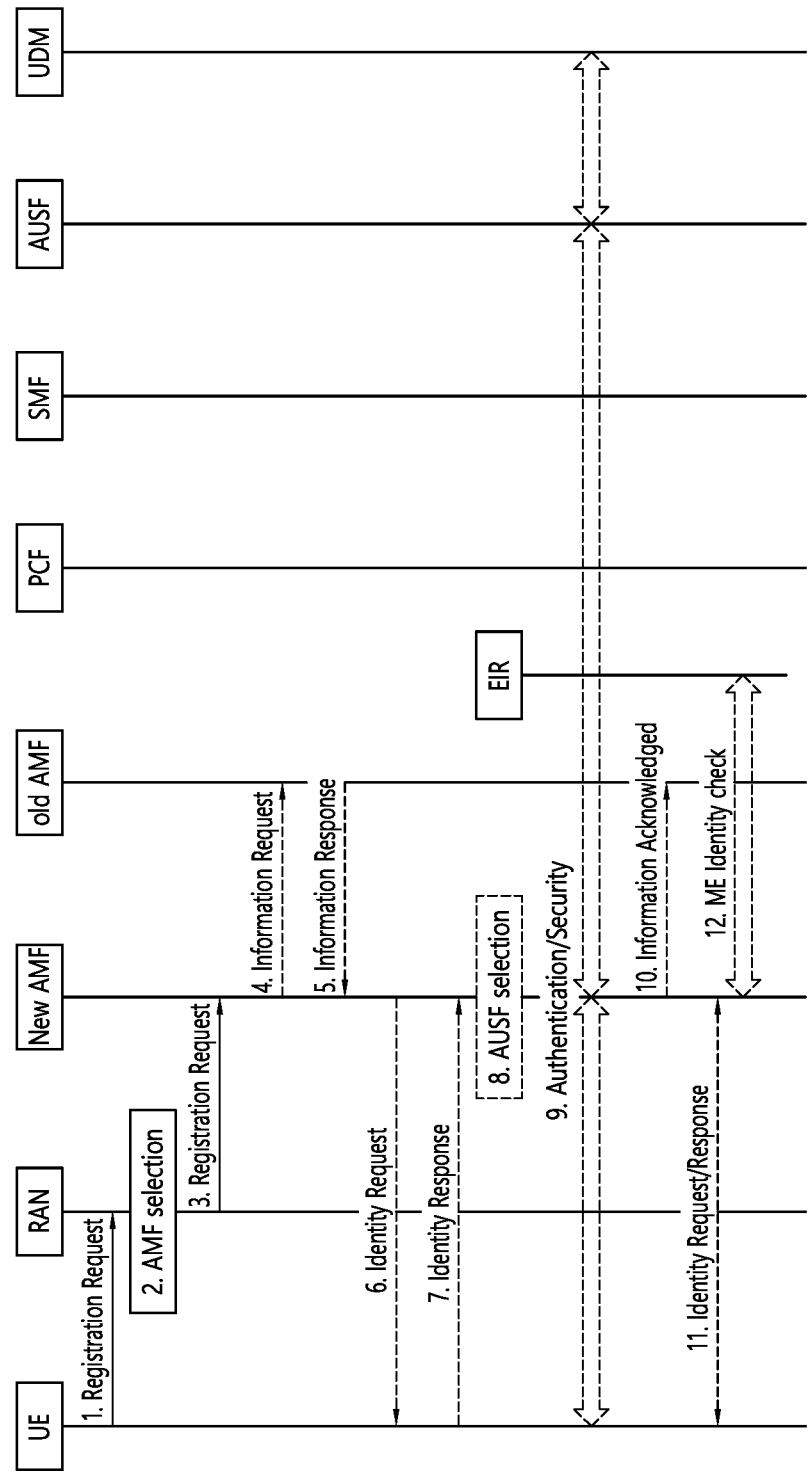

FIGS. 6*a* and 6*b* are a signal flowchart illustrating an exemplary registration procedure.)

1) The UE may transmit an AN message to the RAN. The AN message may include an AN parameter and a registration request message. The registration request message may include information, such as a register type, a subscriber permanent ID or temporary user ID, a security parameter, Network Slice Selection Assistance Information (NSSAI), 5G capability of the UE, a Protocol Data Unit (PDU) session status, and so on.

In case of a 5G RAN, the AN parameter may include a Subscription Permanent Identifier (SUPI) or a temporary user ID, a selected network, and NSSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a Public Land Mobile Network (PLMN) other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Step 4 to Step 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Step 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information on the allowed NSSAI and the mapped NSSAI. The information on the allowed NSSAI information for the UE's access type may be contained within N2 messages containing the registration accept message. The information on the mapped NSSAI is information for mapping each S-NSSAI of the allowed NSSAI to the S-NASSI of the NSSAI set up for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

PDU Session Establishment Procedure

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 7A:
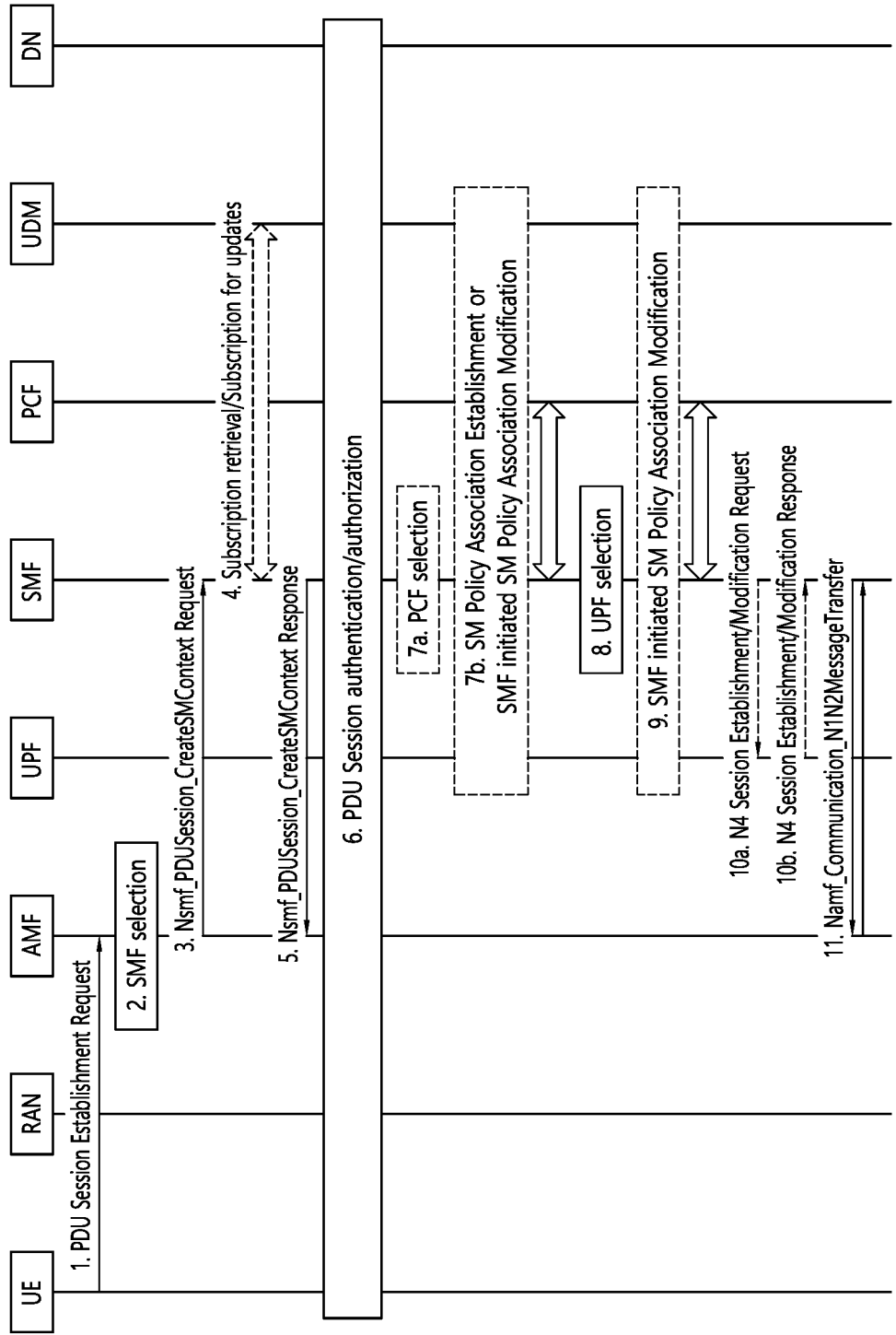

FIGS. 7a and 7b are a signal flowchart illustrating an exemplary PDU session establishment procedure.

The procedure shown in FIGS. 7a and 7b assumes that the UE has already registered on the AMF according to the registration procedure shown in FIG. 6. Therefore, it is assumed that the AMF has already acquired user subscription data from UDM.

1) The UE transmits a NAS message to the AMF. The message may include Single Network Slice Selection Assistance Information (S-NSSAI), Data network Name (DNN), PDU session ID, a Request type, N1 SM information, and so on.

Specifically, the UE includes S-NSSAI from allowed NSSAI for the current access type. If information on the mapped NSSAI has been provided to the UE, the UE may provide both S-NSSAI based on the allowed NSSAI and the corresponding S-NSSAI based on the information on the mapped NSSAI. Here, the information on the mapped NSSAI is information on mapping of each S-NSSAI in the allowed NSSAI (HPLMN).

More specifically, the UE may extract and store the allowed NSSAI and the information on the mapped NSSAI, included in the registration accept message received from the network (i.e., AMF) in the registration procedure in FIG. 6. Therefore, the UE may transmit by including both S-NSSAI based on the allowed NSSAI and the corresponding S-NSSAI based on the information on the mapped NSSAI in the PDU session establishment request message.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

The AMF may select SMF.

3) The AMF may transmit Nsmf_PDUSession_CreateSMContext Request message or Nsmf_PDUSession_UpdateSMContext Request message to the selected SMF.

The Nsmf_PDUSession_CreateSMContext Request message may include SUPI, DNN, S-NSSAI(s), PDU Session ID, AMF ID, Request Type, PCF ID, Priority Access, N1 SM container, User location information, Access Type, PEI, GPSI, UE presence in LADN service area, Subscription For PDU Session Status Notification, DNN Selection Mode, and Trace Requirements. The SM container may include a PDU Session Establishment Request message.

The Nsmf_PDUSession_UpdateSMContext Request message may include SUPI, DNN, S-NSSAI(s), SM Context ID, AMF ID, Request Type, N1 SM container, User location information, Access Type, RAT type, and PEI. The N1 SM container may include a PDU Session Establishment Request message.

The AMF ID is used to identify the AMF serving the UE. The N1 SM information may include a PDU session establishment request message received from the UE.

4) The SMF transmits a Subscriber Data Request message to the UDM. The Subscriber Data Request message may include a subscriber permanent ID and DNN. The UDM may transmit a Subscription Data Response message to the SMF.

In the above-described step 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits Nsmf_PDUSession_CreateSMContext Response message or Nsmf_PDUSession_UpdateSMContext Response message to the AMF.

The Nsmf_PDUSession_CreateSMContext Response message may include Cause, SM Context ID, or N1 SM container. The N1 SM container may include a PDU Session Reject.

In step 3 above, when the SMF has received the Nsmf_PDUSession_CreateSMContext Request message and the SMF can process the PDU Session establishment request message, the SMF creates SM context and the SM context ID is delivered to the AMF.

6) Secondary authentication/authorization is optionally performed.

7a) If the dynamic PCC is used for the PDU session, the SMF selects the PCF.

7b) The SMF performs an SM policy association establishment procedure in order to establish an SM policy association with the PCF.

8) If the request type in step 3 indicates "initial request", the SMF selects the SSC mode for the PDU session. If step 5 is not performed, SMF may also select UPF. In case of the request type IPv4 or IPv6, the SMF may allocate an IP address/prefix for the PDU session.

9) The SMF provides information on the policy control request trigger condition by performing the SM policy association modification procedure.

10) If the request type indicates "initial request", the SMF may start the N4 session establishment procedure using the selected UPF, otherwise may start the N4 session modification procedure using the selected UPF.

10a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

10b) By transmitting an N4 Session Establishment/Modification response message, the UPF may respond. In case the CN tunnel information is allocated by the UPF, the CN tunnel information may be provided to the SMF.

11) The SMF transmits Namf_Communication_N1N2MessageTransfer message to the AMF. The Namf_Communication_N1N2MessageTransfer message may include PDU Session ID, N2 SM information, and N1 SM container.

The N2 SM information may include PDU Session ID, QoS Flow ID (QFI), QoS Profile(s), CN Tunnel Info, S-NSSAI from the Allowed NSSAI, Session-AMBR, PDU Session Type, User Plane Security Enforcement information, UE Integrity Protection Maximum Data Rate.

The N1 SM container may include a PDU session establishment accept message.

The PDU session establishment accept message may include an allowed QoS rule, SSC mode, S-NSSAI, and an assigned IPv4 address.

12) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

13) The RAN may perform a specific signaling exchange with a UE being related to the information received from the SMF.

The RAN also allocates RAN N3 tunnel information for the PDU session.

The RAN forwards the NAS message, which is provided in the step 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

14) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

15) The AMF may transmit Nsmf_PDUSession_UpdateSMContext Request message to the SMF. The Nsmf_PDUSession_UpdateSMContext Request message may include N2 SM information. Herein, the AMF may forward the N2 SM information received from the RAN to the SMF.

16a) If an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in the step 8.

16b) The UPF may transmit an N4 Session Modification Response message to the SMF.

17) The SMF transmits Nsmf_PDUSession_UpdateSMContext Response message to the AMF.

After this step, the AMF can deliver the related event to the SMF.

18) The SMF transmits Nsmf_PDUSession_SMContextStatusNotify message.

19) The SMF transmits information to the UE through the UPF. More specifically, in case of PDU Type IPv6, the SMF may generate an IPv6 Router Advertisement and may transmit the generated advertisement to the UE through the N4 and UPF.

During the procedure, if the PDU Session Establishment is not successful, the SMF notifies this to the AMF.

Figure 8A:
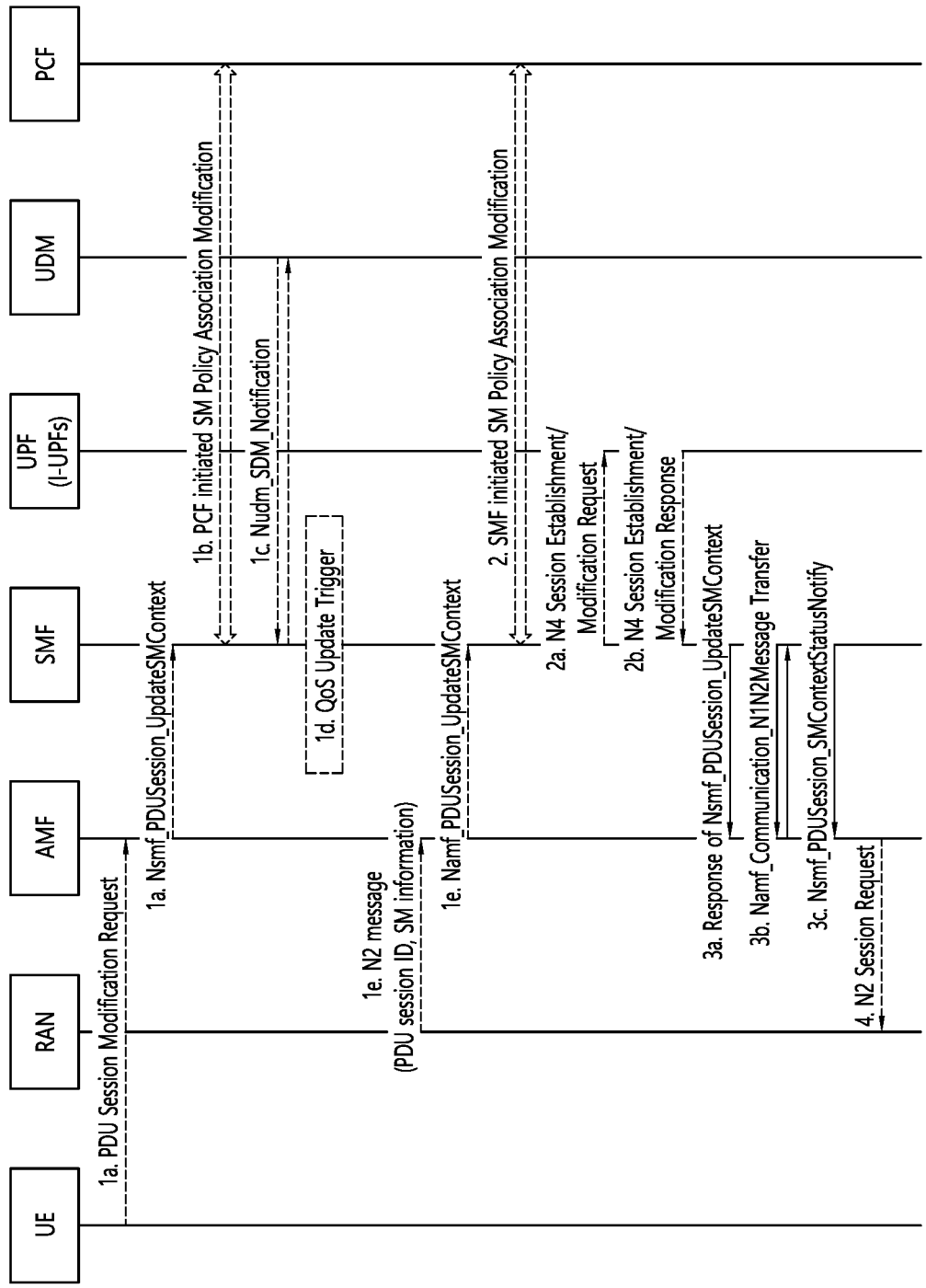
FIGS. 8a and 8b show a modification procedure for a PDU session.
Figure 8B:
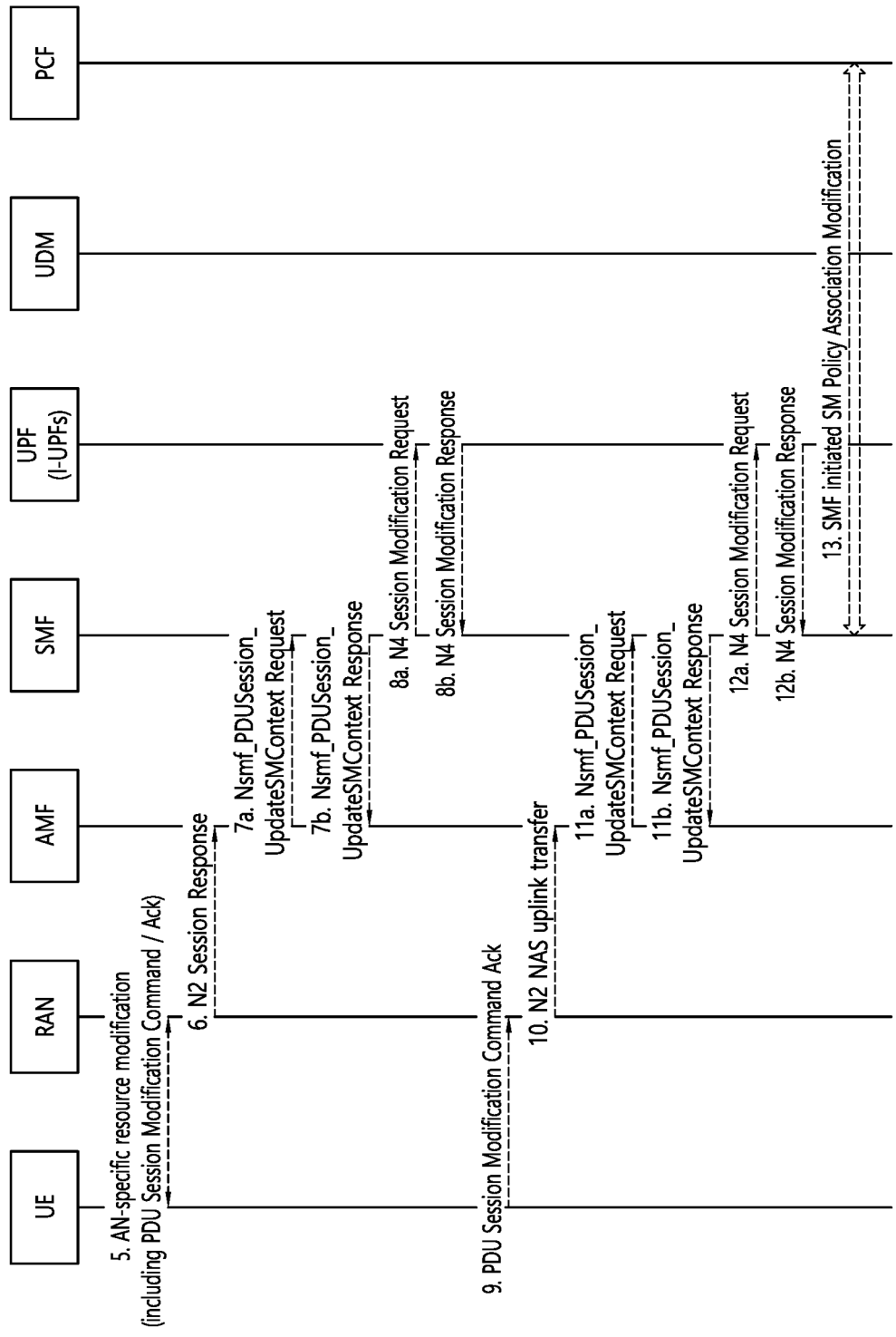

FIGS. 8*a* and 8*b* show a modification procedure for a PDU session.

The MA PDU session may be established/managed based on the PDU session modification procedure.

The PDU session modification procedure may be initiated by the UE or may be initiated by the network.

1a) When initiated by the UE, the UE may initiate a PDU session modification procedure by sending a NAS message. The NAS message may include an N1 SM container. The N1 SM container may include a PDU session modification request message, a PDU session ID, and information on the maximum data rate for integrity protection of the UE. The PDU session modification request message may include a PDU session ID, packet filters, requested QoS information, 5GSM core network capabilities, and the number of packet filters. The maximum data rate for integrity protection of the UE indicates the maximum data rate at which the UE can support UP integrity protection. The number of packet filters indicates the number of packet filters supported for QoS rules.

The NAS message is transmitted to an appropriate AMF according to the location information of the UE via the RAN. Then, the AMF transmits an Nsmf_PDUSession_UpdateSMContext message to the SMF. The message may include a Session Management (SM) context ID and an N1 SM container. The N1 SM container may include a PDU session modification request message.

1b) When initiated by the PCF among network nodes, the PCF may inform the SMF of the policy change by initiating an SM policy association modification procedure.

1c) When initiated by the UDM among the network nodes, the UDM may update the subscription data of the SMF by transmitting a Nudm_SDM_Notification message. The SMF may update the session management subscriber data and transmit an ACK message to the UDM.

1d) When initiated by SMF among network nodes, SMF may trigger QoS update.

When triggered according to 1a to 1d above, the SMF may perform a PDU session modification procedure.

1e) When initiated by an AN among network nodes, the AN may notify the SMF when an AN resource to which a QoS flow is mapped is released. The AN may transmit an N2 message to the AMF. The N2 message may include a PDU session ID and N2 SM information. The N2 SM information may include QoS Flow ID (QFI), user location information, and an indication indicating that the QoS flow is released. The AMF may transmit an Nsmf_PDUSession_UpdateSMContext message. The message may include SM context ID and N2 SM information.

2) The SMF may transmit a report on the subscription event by performing the SM policy association modification procedure. If the PDU session modification procedure is triggered by 1b or 1d, this step may be skipped. If a dynamic PCC is not deployed in the network, the SMF may apply an internal policy to decide to change the QoS profile.

Steps 3 to 7, which will be described later, may not be performed when the PDU session modification requires only the UPF operation.

3a) When initiated by the UE or AN, the SMF may respond to the AMF by sending an Nsmf_PDUSession_UpdateSMContext message. The message may include N2 SM information and an N2 SM container. The N2 SM information may include a PDU session ID, QFI, QoS profile, and session-AMBR. The N1 SM container may include a PDU session modification command The PDU session modification command may include a PDU session ID, a QoS rule, a QuS rule operation, QoS flow level QoS parameters, and a session-AMBR.

The N2 SM information may include information to be transmitted by the AMF to the AN. The N2 SM information may include a QFI and a QoS profile to notify the AN that one or more QoS flows are added or modified. If the PDU session modification is requested by the UE for which the user plane resource is not configured, the N2 SM information to be delivered to the AN may include information on the establishment of the user plane resource.

The N1 SM container may include a PDU session modification command to be delivered by the AMF to the UE. The PDU session modification command may include QoS rules and QoS flow level QoS parameters.

3b) When initiated by the SMF, the SMF may transmit a Namf_Communication_N1N2MessageTransfer message. The message may include N2 SM information and N1 SM container. The N2 SM information may include a PDU session ID, QFI, QoS profile, and session-AMBR. The N1SM container may include a PDU session modification command The PDU session modification command may include a PDU session ID, a QoS rule, and a QoS flow level QoS parameters.

If the UE is in the CM-IDLE state and ATC is activated, the AMF updates and stores the UE context based on the Namf_Communication_N1N2MessageTransfer message, and then steps 3 to 7 described later may be skipped. When the UE enters the reachable state, i.e., the CM-CONNECTED state, the AMF may transmit an N1 message to synchronize the UE context with the UE.

4) The AMF may transmit an N2 PDU session request message to the AN. The N2 PDU session request message may include N2 SM information received from the SMF and a NAS message. The NAS message may include a PDU session ID and an N1 SM container. The N1 SM container may include a PDU session modification command.

5) The AN performs AN signaling exchange with the UE related to the information received from the SMF. For example, in the case of NG-RAN, i.e., gNB or base station, in order to modify the necessary AN resources related to the PDU session, an RRC connection reconfiguration procedure may be performed with the UE.

6) The AN transmits an N2 PDU session ACK message in response to the received N2 PDU session request. The N2 PDU session ACK message may include N2 SM information and user location information. The N2 SM information may include a list of accepted/rejected QFIs, AN tunnel information, and a PDU session ID.

7) The AMF delivers the N2 SM information and user location information received from the AN to the SMF through the Nsmf_PDUSession_UpdateSMContext message. Then, the SMF delivers the Nsmf_PDUSession_UpdateSMContext message to the AMF.

8) The SMF transmits an N4 session modification request message to the UPF to update the N4 session of the UPF included in the PDU session modification.

When a new QoS flow is generated, the SMF updates the UL packet detection rule of the new QoS flow together with the UPF.

9) The UE transmits a NAS message in response to receiving the PDU session modification command The NAS message may include a PDU session ID and an N1 SM container. The N1 SM container may include a PDU session modification command ACK.

10) The AN transmits the NAS message to the AMF.

11) The AMF may deliver the N1 SM container and user location information received from the AN to the SMF through an Nsmf_PDUSession_UpdateSMContext message. The N1 SM container may include a PDU session modification command ACK. The SMF may deliver an Nsmf_PDUSession_UpdateSMContext response message to the AMF.

12) The SMF transmits an N4 session modification request message to the UPF to update the N4 session of the UPF included in the PDU session modification. The message may include an N4 session ID.

13) When the SMF interacts with the PCF in step 1b or step 2 above, the SMF may inform the PCF whether or not the PCC decision can be performed through the SM policy association modification procedure.

The SMF may notify the requesting entity for user location information related to the change of the PDU session.

Problems to be Solved by the Disclosure of the Present Specification

When the UE creates a PDU session in 3GPP access or non-3GPP access and then attempts to perform handover to another access, the handover may fail if resource reservation fails in the access network.

According to the current standard specifications, in this case, the SMF informs the AMF that the PDU session has been released. In this case, AMF deletes all contexts for the corresponding PDU session. In this case, the UE can no longer send and receive NAS signaling for the PDU session.

Also, in a situation where PDU session synchronization is performed between the UE and the AMF, since the AMF indicates that there is no corresponding PDU session, the UE thinks that the PDU session has been released from the network and locally releases the PDU session. In this case, since the AMF does not send signaling for local release to the SMF, there is a problem in that the PDU session context remains in the UPF and the access network.

Also, although the UE can use the PDU session, the PDU session is released because the handover fails, resulting in a problem in that the user's service is cut off.

Disclosure of the Present Specification

The disclosures of the present specification provide methods for solving the above-described problems.

Although each of the following drawings shows an embodiment of each disclosure, the embodiments of the drawings may be implemented in combination with each other.

The disclosures of the present specification consist of a combination of one or more operations/configurations/steps described below.

I. Overview of Disclosures of the Present Specification

In order to handover a PDU session between the 3GPP access and the non-3GPP access, a PDU session establishment procedure is currently used. In this case, when a new PDU session is created, the request type may be set to "initial request". When the PDU session establishment is for handover, the request type may be set to "Existing PDU Session". When the AMF receives a PDU session establishment message, it is configured to immediately create a PDU session context.

I-1. SMF-Based Solution

According to the first method, when the SMF determines that creation of a new PDU session is requested based on the request type in the received PDU session establishment request message, the SMF may inform that the PDU session has been released by transmitting a context status notify message (e.g., Nsmf_PDUSession_SMcontextStatusNotify message). On the other hand, when the SMF determines that handover is requested based on the request type in the received PDU session establishment request message, the SMF may include information informing that the handover has been canceled and the access type of the PDU session in the context status notify message (e.g., Nsmf_PDUSession_SMcontextStatusNotify message) to be transmitted to the AMF.

In this case, if the handover fails, the AMF updates the access type informed by the SMF without deleting the PDU session context.

I-2. AMF-Based Solution

According to the second method, when the request type in the received PDU session establishment request message is "Existing PDU Session", the AMF may not immediately update the access type of the PDU session, but may later update the access type when receiving a notification message from the SMF informing that the handover has been successfully performed. In this case, the AMF needs to remember that the handover is in progress.

Based on this, when the SMF notifies that the PDU session has been released by transmitting a context status notify message (e.g., Nsmf_PDUSession_SMcontextStatusNotify message), the AMF may recognize that the handover has failed. In addition, while recognizing that handover is in progress, when the UE or SMF requests to transmit NAS signaling, the AMF transmits the NAS signaling on an access type (e.g., non-3GPP access) other than the access type (e.g., 3GPP access) of the current PDU session.

When the AMF receives a notification from the SMF informing that the PDU session handover has been successful or receives a message from the access network informing the PDU setup success for the PDU session in which the handover is being performed, the AMF determines that the handover has been completed successfully and updates the access type of the PDU session.

II. First Disclosure of the Present Specification

FIG. 9 is an exemplary diagram illustrating an example in which establishment of a new PDU session fails.

Step 1. The UE transmits a PDU session establishment request message to the AMF through the NG-RAN.

Step 2. The AMF creates and stores PDU session contexts when it receives PDU session establishment request message. If the PDU session establishment fails, the SMF sends PDU session establishment reject message to the UE using either Namf_Communication_N1N2MessageTransfer Request message or Nsmf_PDUSession_UpdateSMContext response message. After that, the SMF notifies that the PDU session is released by sending Nsmf_PDUSession_SMContextStatusNotify message.

Above failure case does not differentiate new session establishment and handover scenario.

As a result, if the UE requests to handover a PDU session from non-3GPP access to 3GPP access and fails during the procedure, the SMF may notify the AMF that the PDU session is released. In this case, the AMF removes the associated PDU Session contexts. As a result, during the PDU session synchronization procedure (e.g., registration or service request procedure), the PDU session is released in the UE locally while the SMF does not notified anything about the release and the PDU session contexts are still remains in the NG-RAN and UPF.

Problem 1: If the PDU session establishment procedure fails during the handover between 3GPP access and non-3GPP access, the PDU session is released in the UE and AMF while the SMF and the AN keeps the PDU session contexts.

In order to solve above issue, the SMF should not notify that the PDU session is released. That is, the SMF needs to have different behavior according to the request type. If the request type is set to "initial request", the SMF may notify the release of the PDU session. If the request type is set to "Existing PDU Session", the SMF needs not to notify the release.

Proposal 1: During the PDU session establishment procedure, if the procedure fails, the SMF may notify the release of the PDU session only when the request type is set to "initial request" by sending Nsmf_PDUSession_SMContextStatusNotify.

Even though the SMF does not notify the AMF of the PDU session release, there may be another issue. When the AMF received PDU session establishment Request message with request type indicating "Existing PDU Session", the AMF updates access type of the PDU session. If the handover procedure fails, access type of the PDU session is changed, which is different from the actual access type of the PDU session. In this case, similar problem with the above Problem 1 may happen. Because PDU session status is used to synchronize the PDU session of the specific access, the AMF may mark the PDU session as released even though the PDU session is still available on the other access.

Then the UE locally releases the PDU session and the SMF does not notify anything about the release. The PDU session contexts are still remains in the AN and UPF.

Problem 2: If the PDU session establishment procedure fails during the handover between 3GPP access and non-3GPP access and the SMF does not notify that the handover is failed, the PDU session is released in the UE and AMF while the SMF and the AN keeps the PDU session contexts.

In order to solve the issue, the SMF notifies the AMF that the handover procedure is failed so that the AMF updates access type of the PDU session. Nsmf_PDUSession_SMContextStatusNotify message may be used to notify the handover failure. When the AMF received the notification, the AMF needs to update access type of the PDU session accordingly, e.g., 3GPP access to non-3GPP access and vice versa. The other possibility is that the SMF explicitly notifies access type of the PDU session. Considering that the former method may have issue in case of abnormal scenario, the latter method, i.e., the AMF updates access type of the PDU session to based on information from the SMF, may be preferred.

Proposal 2: The SMF may notify the handover failure of the PDU session when the Request Type is set to "Existing PDU Session" by sending Nsmf_PDUSession_SMContextStatusNotify including access type of the PDU session.

Proposal 3: When the AMF received the handover failure notification from the SMF, the AMF may update access type of the PDU session based on information from the SMF.

II-1. Non-Roaming and Local BreakOut (LBO) Roaming

Figure 10A:
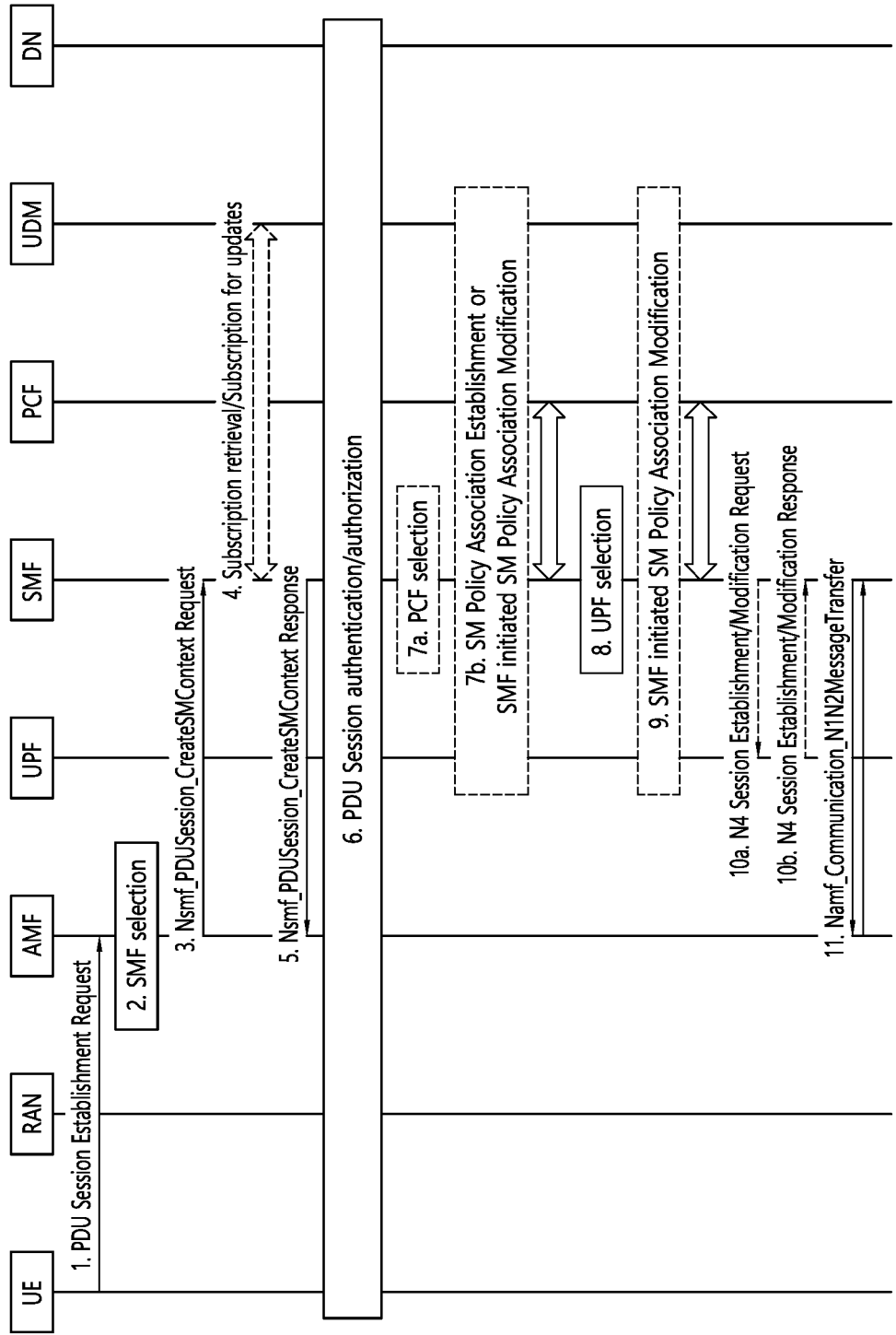
FIGS. 10a and 10b are exemplary diagrams illustrating a PDU session establishment procedure for non-roaming and Local Breakout (LBO) scheme roaming.
Figure 10B:
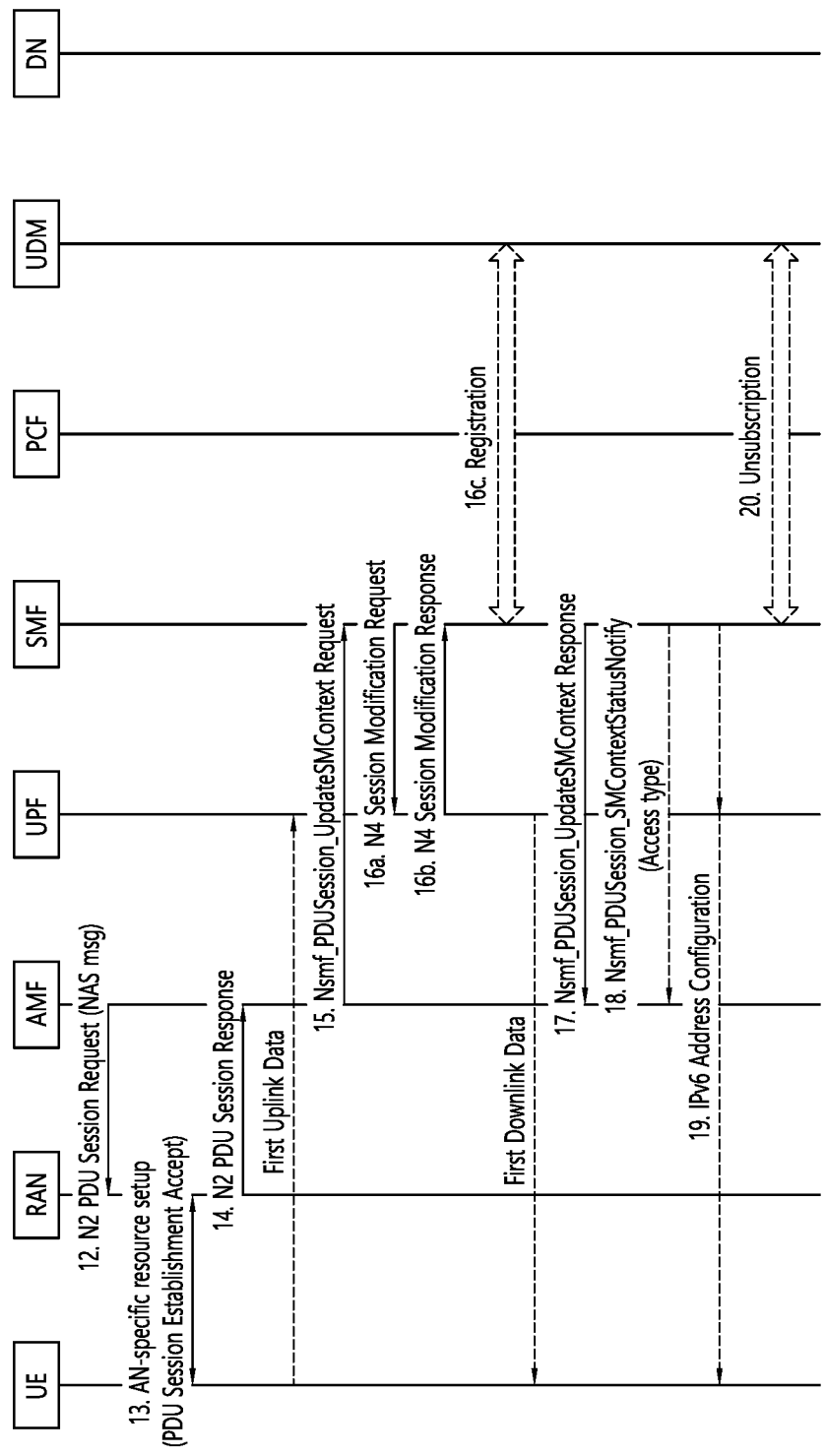

FIGS. 10a and 10b are exemplary diagrams illustrating a PDU session establishment procedure for non-roaming and Local Breakout (LBO) scheme roaming.

The PDU session establishment procedure shown in FIGS. 10a and 10b is mostly the same as the procedure shown in FIGS. 7a and 7b. Therefore, a detailed description of the same procedure will be omitted, and the description of the procedure of FIGS. 7a and 7b will be used as it is.

Step 18. The SMF transmits Nsmf_PDUSession_SMContextStatusNotify message to the AMF.

If the PDU session establishment is not successful and the SMF has received the PDU session establishment request message including request type set to "initial request", the SMF informs the AMF by transmitting Nsmf_PDUSession_SMContextStatusNotify message. The SMF also releases any N4 session, any PDU session address (e.g., IP address), and releases the association with the PCF.

If the PDU session establishment is not successful and the SMF has received the PDU session establishment request message including request type set to "Existing PDU Session", the SMF revokes handover procedure and informs the AMF of the handover failure by transmitting Nsmf_PDUSession_SMContextStatusNotify message including status information and cause information. The SMF includes information on the associated access of the PDU session in the status information. When the AMF received the notification, the AMF updates associated access of the PDU session based on received information. The SMF may initiate SM policy association modification procedure to report the change of access.

II-2. Home Routed (HR) Roaming

Figure 11A:
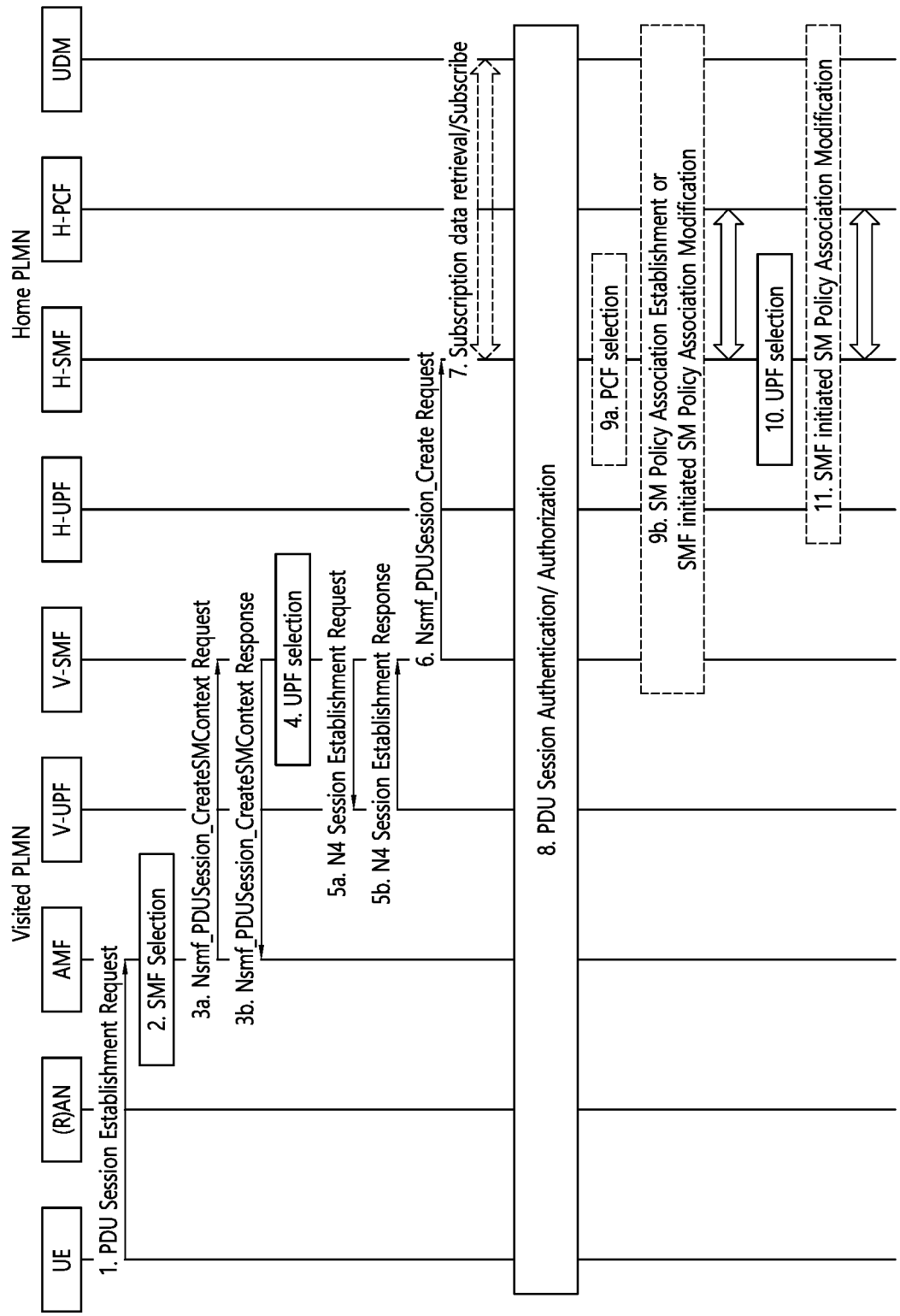
FIGS. 11a and 11b are exemplary diagrams illustrating a PDU session establishment procedure for HR scheme roaming.
Figure 11B:
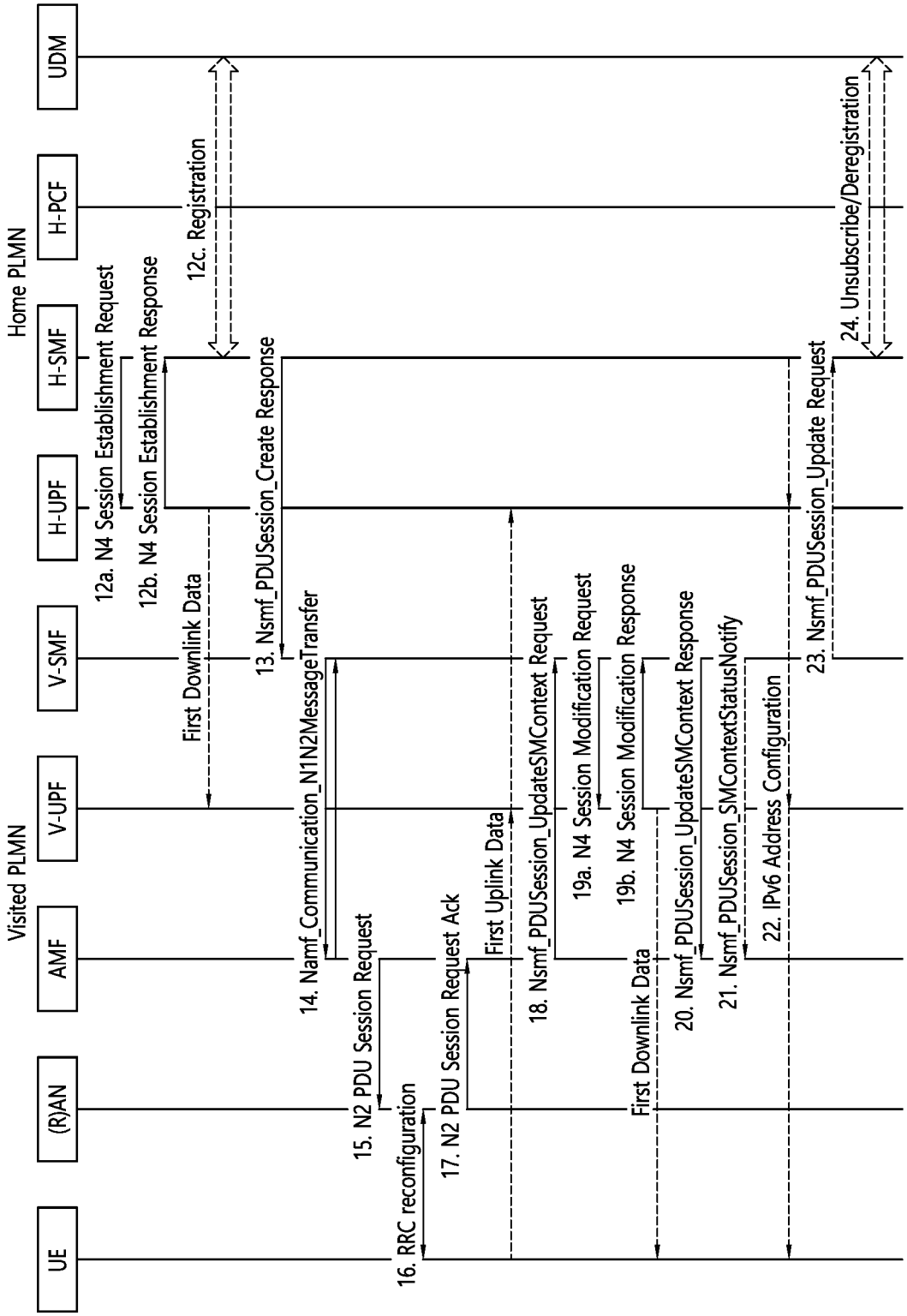

FIGS. 11a and 11b are exemplary diagrams illustrating a PDU session establishment procedure for HR scheme roaming.

Step 1. This step is the same as step 1 shown in FIG. 7a.

Step 2. The AMF selects an SMF in HPLMN using the S-NSSAI with the value defined by the HPLMN. The AMF may also receive information on alternative H-SMFs from the NRF. The AMF may store the association of the S-NSSAI(s), the DNN, the PDU session ID, the SMF ID in VPLMN as well as access type of the PDU session.

Step 3. In LBO roaming case, if the V-SMF responds to the AMF indicating that the V-SMF is not able to process some part of the N1 SM information, the AMF proceeds steps for HR roaming scheme and may select an SMF in the VPLMN different from the V-SMF selected earlier.

Step 3a. The AMF also provides the identity of the H-SMF it has selected in step 2 and both the VPLMN S-NSSAI from the Allowed NSSAI and the corresponding S-NSSAI of the HPLMN. The H-SMF is provided when the PDU session is HR scheme. The AMF may also provide the identity of alternative H-SMFs.

The V-SMF does not use DNN selection mode received from the AMF but relays this information to the H-SMF.

The AMF may include the H-PCF ID and the V-SMF may pass it to the H-SMF.

Step 3b. If the PDU session type is "Unstructured" and the V-SMF received an "Invoke NEF" flag, then it may skip steps 4 and 5.

Step 4. The V-SMF selects a UPF in VPLMN.

Step 5. The V-SMF initiates an N4 session establishment procedure with the selected V-UPF.

Step 5a. The V-SMF sends an N4 session establishment request message to the V-UPF. If CN Tunnel Info is allocated by the SMF, the CN Tunnel Info may be provided to the V-UPF.

Step 5b. The V-UPF acknowledges by sending an N4 session establishment response message. If CN Tunnel Info is allocated by the V-UPF, the CN Tunnel Info may be provided to the V-SMF.

Step 6. The V-SMF may transmit Nsmf_PDUSession_Create request message to the H-SMF. The message may include SUPI, GPSI, V-SMF SM context ID, DNN, S-NSSAI with the value defined by the HPLMN, PDU session ID, V-SMF ID, V-CN-Tunnel-Info, PDU session type, PCO, number of packet filters, user location information, access type, PCF ID, SM PDU DN request container, DNN selection mode, AMF ID, etc. Protocol Configuration Options may contain information that the H-SMF may need to properly establish the PDU session (e.g., SSC mode or SM PDU DN request container to be used to authenticate the UE). The H-SMF may use DNN selection mode when deciding whether to accept or reject the UE request. If the V-SMF does not receive any response from the H-SMF due to communication failure on the N16 interface, depending on operator policy, the V-SMF may create the PDU session to one of the alternative H-SMF(s).

The V-SMF SM context ID contains the addressing information it has allocated for service operations related with this PDU session. The H-SMF stores an association of the PDU session and V-SMF Context ID.

If the H-SMF needs to use V-SMF services for this PDU session, the H-SMF may provide the V-SMF with the H-SMF SM context ID it has allocated for service operations related with this PDU session.

Steps 7-12b. These steps are the same as steps 4 to 10 of FIG. 7a. However, there are differences as follows.

These steps are executed in HPLMN.

The H-SMF may not provide the Inactivity timer to the H-UPF.

Step 5 of FIG. 7a may not be executed.

Step 12c. This step is the same as step 16c of FIG. 7b.

The H-SMF registers for the PDU session with the UDM using Nudm_UECM_Registration message. The Nudm_UECM_Registration message includes SUPI, DNN, S-NSSAI with the value defined by the HPLMN, PDU session ID.

Step 13. The H-SMF transmits Nsmf_PDUSession_Create response message to the V-SMF. The Nsmf_PDUSession_Create response message may include QoS rule, QoS flow level QoS parameters, PCO including session level information that the V-SMF is not expected to understand, selected PDU session type, SSC mode, H-CN Tunnel Info, QFI, QoS profile, reflective QoS timer, information needed by the V-SMF.

If the PDU session being established was requested to be an always-on PDU session, the H-SMF may indicate to the V-SMF whether the request is accepted or not via the always-on PDU session granted indication in the response message to the V-SMF.

If the PDU session being established was not requested to be an always-on PDU session but the H-SMF determines that the PDU session needs to be established as an always-on PDU session, the H-SMF may indicate it to the V-SMF by including always-on PDU session granted indication that the PDU Session is an always-on PDU Session.

The H-CN Tunnel Info contains the tunnel information for uplink traffic towards the H-UPF.

Multiple QoS rules and QoS flow level QoS parameters may be included in the Nsmf_PDUSession_Create response message.

Steps 14-18. These steps are the same as steps 11-15 of FIG. 7b. Hereinafter, only the different parts will be described.

These steps are executed in V-PLMN.

The V-SMF stores an association of the PDU session and H-SMF ID.

If the H-SMF indicates the PDU session can be established as an always-on PDU session, the V-SMF further checks whether the PDU session can be established as an always-on PDU session based on local policies. The V-SMF notifies the UE whether the PDU session is an always-on PDU session or not via the always-on PDU session granted indication in the PDU session establishment accept message.

If the N2 SM information indicates failure of user plane resource setup, and the V-SMF rejected the PDU session establishment, step 19 may be skipped.

Step 19a. The V-SMF initiates an N4 session modification procedure with the V-UPF. The V-SMF provides packet detection, enforcement and reporting rules to be installed on the V-UPF for this PDU session, including AN Tunnel Info, H-CN Tunnel Info and V-CN Tunnel Info.

Step 19b. The V-UPF provides a N4 session modification response to the V-SMF.

After this step, the V-UPF delivers any down-link packets to the UE that may have been buffered for this PDU session.

Step 20. This step is the same as step 17 of FIG. 7b. However, there are differences as follows.

The SMF is a V-SMF. The H-SMF and V-SMF transmits a subscription request message to the AMF for UE reachability event.

Step 21. This step is same as step 18 in FIG. 7b.

If during step 21, after step 14, the PDU session establishment is not successful, and the request type in the PDU session establishment request message received by the V-SMF is set to "initial request", the V-SMF triggers the V-SMF initiated PDU session release procedure.

If during step 21, after step 14, the PDU session establishment is not successful and the request type in the PDU session establishment request message received by the V-SMF is set to "Existing PDU Session", the V-SMF revokes handover procedure and notifies it to the H-SMF by sending Nsmf_PDUSession_Update request message including access type and cause information. When the H-SMF receives the notification, the H-SMF may initiate SM policy association modification procedure to report the change of access. The V-SMF informs the AMF of the handover failure by transmitting Nsmf_PDUSession_SMContextStatusNotify message including status information and cause information. The V-SMF may indicate the associated access of the PDU session in the status information. When the AMF received the notification, the AMF updates associated access of the PDU session based on received information.

Step 22. The H-SMF delivers IPv6 address configuration to the UE through the H-UPF and the V-UPF in VPLMN. In case of PDU session Type IPv6 or IPv4v6, the H-SMF generates an IPv6 Router Advertisement and sends it to the UE via N4 and the H-UPF and V-UPF.

Step 23. If the V-SMF received in step 18 an indication that the AN has rejected some QFI, the V-SMF notifies the H-SMF via a Nsmf_PDUSession_Update request message. The H-SMF is responsible of updating accordingly the QoS rules and QoS flow level QoS parameters if needed for the QoS flow associated with the QoS rule in the UE.

Step 24. This step is the same as step 20 of FIG. 7b. However, there are differences as follows.

This step is executed in the HPLMN.

The SMF also deregisters for the given PDU session using Nudm_UECM_Deregistration message including SUPI, DNN, PDU Session ID. The UDM may update corresponding UE context by transmitting Nudr_DM_Update message including SUPI, subscription data, UE context.

III. Second Disclosure of the Present Specification: Examples of SMF-Based Solution III-1. When 3GPP Access and Non-3GPP Access are the Same PLMN (Non-Roaming or Local Breakout Case)

Figure 12:
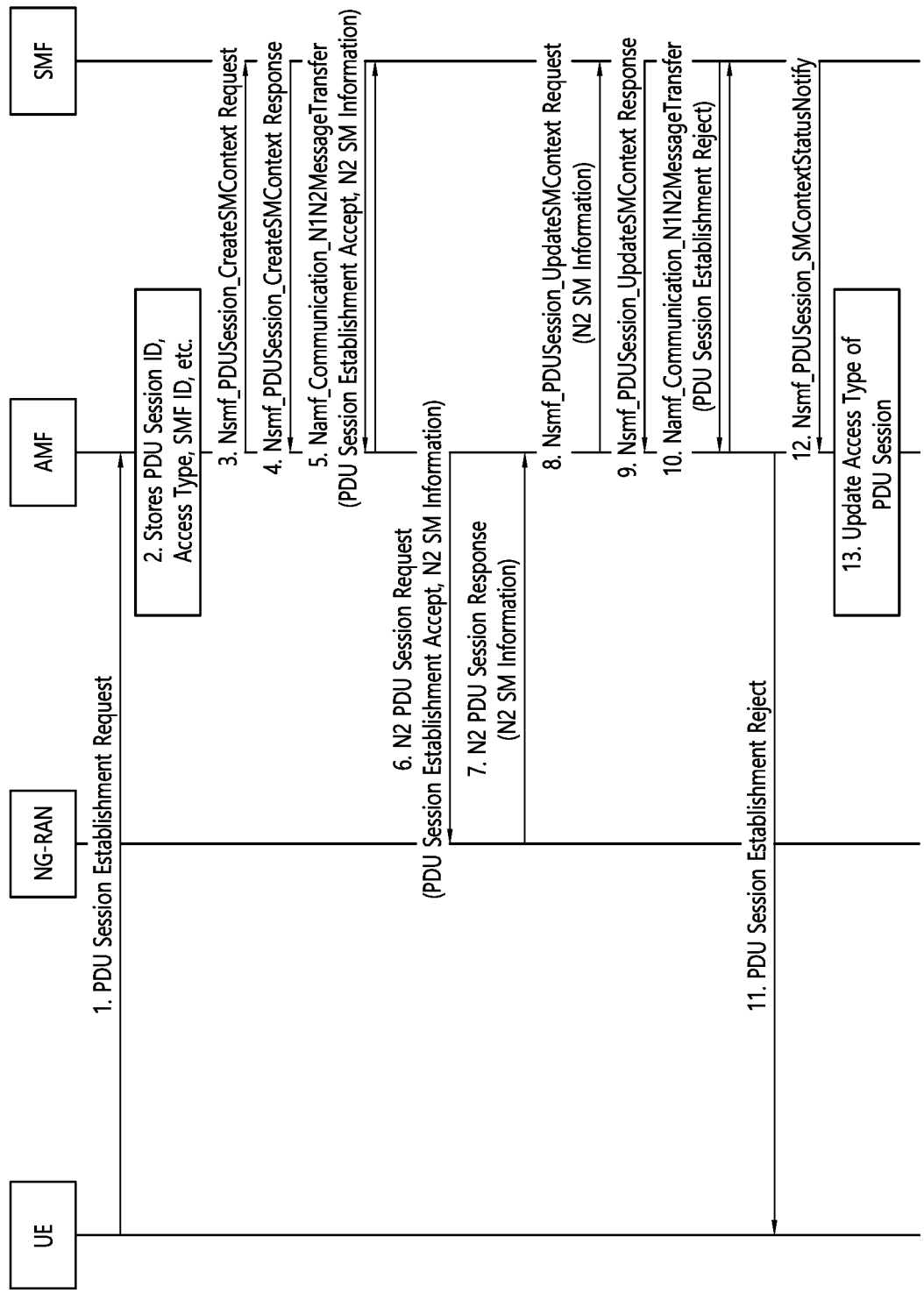
FIG. 12 is an exemplary diagram illustrating an example in which handover from non-3GPP access to 3GPP access fails in a non-roaming or LBO roaming scheme.

FIG. 12 is an exemplary diagram illustrating an example in which handover from non-3GPP access to 3GPP access fails in a non-roaming or LBO roaming scheme.

Step 1. It is assumed that the UE has established a PDU session through non-3GPP access. The UE transmits a PDU session establishment request message including the PDU session ID of the non-3GPP access PDU session and the request type set to "Existing PDU Session" in order to handover the PDU session on the non-3GPP access to the 3GPP access.

Step 2. Upon receiving the message from the UE, the AMF updates the access type information of the PDU session from the non-3GPP access to the 3GPP access based on the PDU session ID information.

Step 3-4. The AMF selects an SMF based on the PDU session ID information, and transmits a PDU session establishment request message including the request type to the selected SMF.

Step 5. The SMF may determine that the UE has requested handover of the PDU session on the non-3GPP access to the 3GPP access based on the PDU session ID information and the request type set to "Existing PDU Session" in the received message.

The SMF generates N2 SM information for user plane setup with the 3GPP access while allowing the UE's request, and transmits it to the AMF along with a PDU session establishment accept message.

Step 6. The AMF transmits the N2 SM information and the PDU session establishment accept message received from the SMF to the NG-RAN.

Step 7. In the NG-RAN, the request of the SMF may be rejected due to lack of radio resources. In this case, the NG-RAN does not deliver the PDU session establishment accept message received from the SMF to the UE, and notifies that the PDU session is not setup in response to the N2 SM information.

Steps 8-9. The AMF transmits the N2 SM information received from the NG-RAN to the SMF.

Step 10-11. The SMF knows that the user plane setup has failed based on the response from the NG-RAN and transmits a PDU session establishment reject message to inform that the UE's request has not been accepted.

Step 12. The SMF transmits the Nsmf_PDUSession_SMcontextStatusNotify message to update the access type information of the PDU session stored in the AMF. In this message, the access type information is set to the non-3GPP access and transmitted. In addition, a cause indicating that the handover has failed is set.

Step 13. The AMF updates the access type of the PDU session to the information sent by the SMF, i.e., the non-3GPP access, based on the information sent by the SMF.

III-2. When 3GPP Access and Non-3GPP Access are Different PLMNs

Figure 13A:
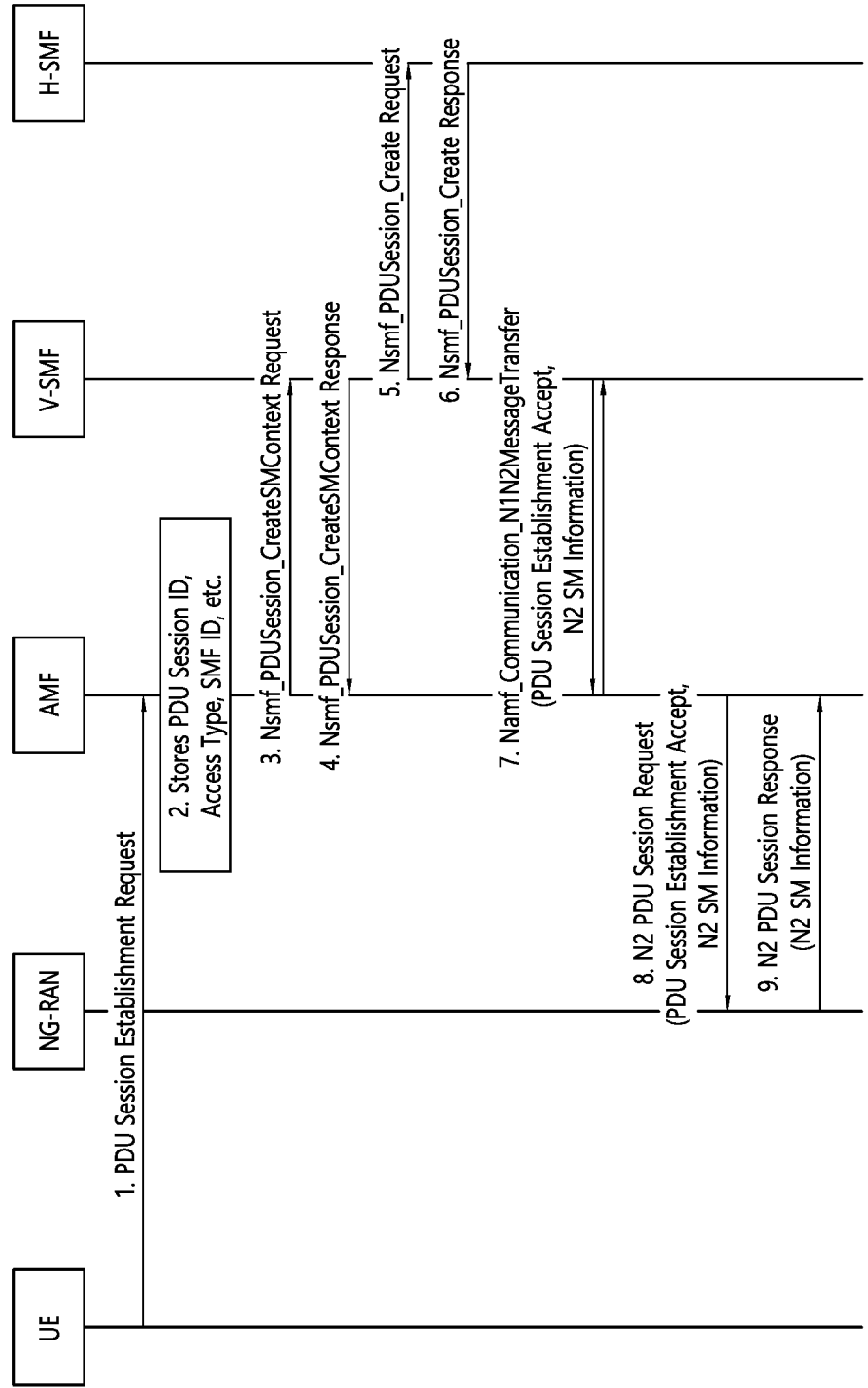
FIGS. 13a and 13b are exemplary diagrams illustrating an example in which handover from non-3GPP access to 3GPP access fails in the HR roaming scheme.
Figure 13B:
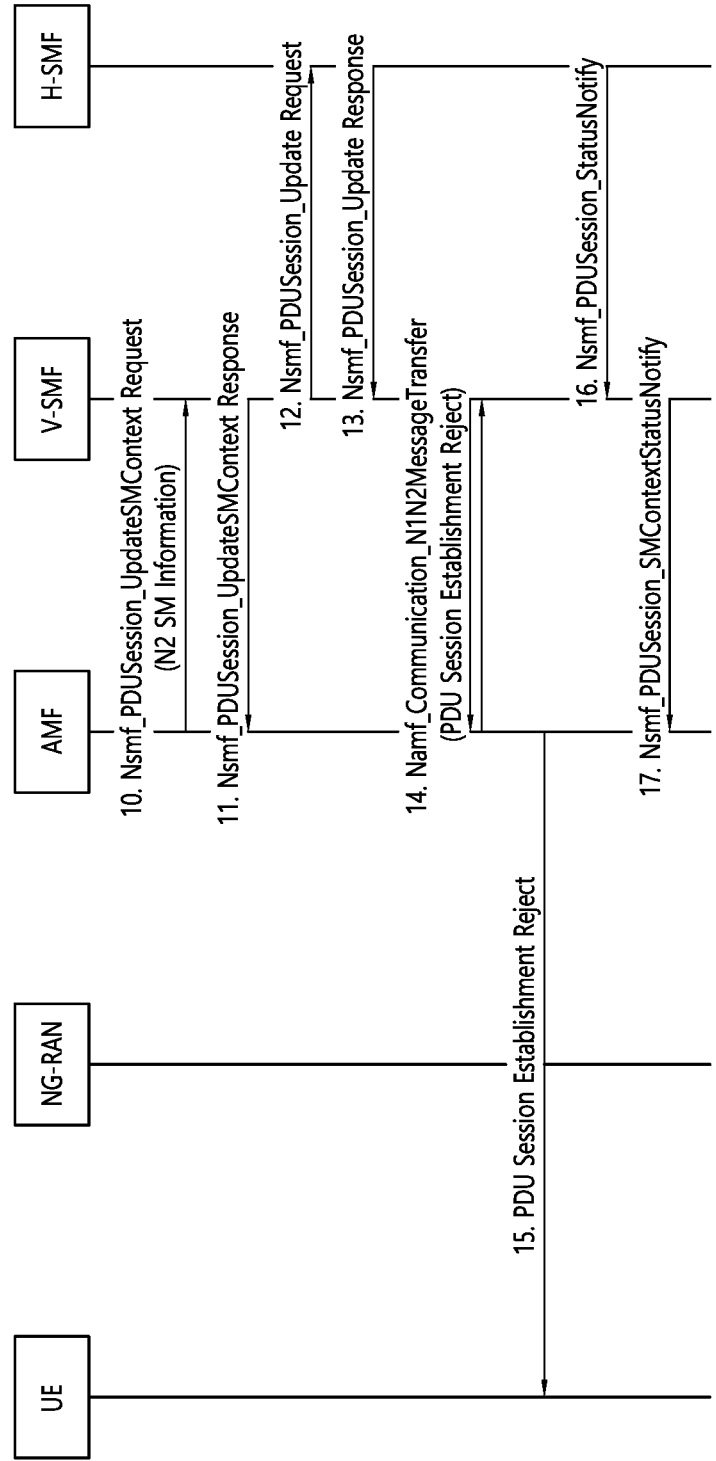

FIGS. 13a and 13b are exemplary diagrams illustrating an example in which handover from non-3GPP access to 3GPP access fails in the HR roaming scheme.

Step 1. It is assumed that the UE has established a PDU session through non-3GPP access. The UE transmits a PDU session establishment request message including the PDU session ID of the non-3GPP access PDU session and the request type set to "Existing PDU Session" in order to handover the PDU session on the non-3GPP access to the 3GPP access.

Step 2. The AMF updates the access type information of the PDU session from the non-3GPP access to the 3GPP access based on the PDU session ID information in the message received from the UE.

Step 3-4. The AMF selects the V-SMF based on information (e.g., DNN, S-NSSAI) in the message received from the UE, and also selects the H-SMF based on the PDU session ID information of the UE. The AMF also transmits the request type sent by the UE while delivering the PDU session establishment request message to the V-SMF. At this time, the H-SMF information selected by the AMF is also transmitted.

Step 5-6. The V-SMF delivers the information sent by the AMF to the H-SMF identified based on the H-SMF information received from the AMF. The H-SMF may determine that the UE requests handover of a PDU session on the non-3GPP access to the 3GPP access based on the PDU session ID information in the message received from the UE and the request type set to "Existing PDU Session". The H-SMF informs the V-SMF that the UE's request is allowed.

Step 7. The V-SMF generates N2 SM information for user plane setup with the 3GPP access while allowing the UE's request, and transmits it to the AMF along with a PDU session establishment accept message.

Step 8. The AMF transmits the N2 SM information and the PDU session establishment accept message received from the V-SMF to the NG-RAN.

Step 9. In the NG-RAN, the request of the V-SMF may be rejected due to lack of radio resources. In this case, the NG-RAN does not deliver the PDU session establishment accept message received from the V-SMF to the UE, and includes information informing that the PDU session is not setup in response to the N2 SM information.

Step 10-11. The AMF transmits the N2 SM information received from the NG-RAN to the V-SMF.

Step 12-13. The V-SMF informs the H-SMF that the user plane setup has failed based on the user plane setup response from the NG-RAN.

Step 14-15. The V-SMF transmits a PDU session establishment reject message to the UE in order to reject the UE's handover request because the user plane resource setup has failed.

Step 16. Since handover of the PDU session has failed, the H-SMF transmits an Nsmf_PDUSession_StatusNotify message to delete the PDU session context of the 3GPP access side.

Step 17. The V-SMF transmits an Nsmf_PDUSession_SMcontextStatusNotify message to delete the PDU session context of the AMF. And the V-SMF deletes the context related to the PDU session. Upon receiving this, the AMF deletes the context related to the PDU session.

IV. Brief Summary of Disclosures of the Present Specification

IV-1. SMF-Based Solution

When the SMF receives a PDU session establishment request message including a request type set to "initial request", if the PDU session establishment fails, the SMF may transmit an Nsmf_PDUSession_SMcontextStatusNotify message to the AMF to inform that the PDU session is released.

When the SMF receives a PDU session establishment request message including the request type set to "Existing PDU Session", if the PDU session establishment fails, the SMf may transmit an Nsmf_PDUSession_SMcontextStatusNotify message to the AMF to notify the handover failure and the access type of the PDU session.

The AMF may update the access type of the PDU session based on the access type included in the Nsmf_PDUSession_SMcontextStatusNotify message received from SMF.

IV-2. AMF-Based Solution

When the AMF receives the PDU session establishment request message including the request type set to "Existing PDU Session", the AMF may determine that handover is in progress without immediately updating the access type of the PDU session.

When the AMF receives NAS signaling from the UE or SMF for the PDU session for which handover is in progress, the AMF may transmit NAS signaling in an access type (e.g., non-3GPP access) opposite to the access type (e.g., 3GPP access) of the PDU session.

When the AMF receives the Nsmf_PDUSession_SMcontextStatusNotify message from the SMF informing that the PDU session has been released, the AMF may recognize that the handover of the PDU session has failed and determine that the handover procedure is over.

When the AMF receives a notification message informing that handover of the PDU session was successful from the SMF or receives a message informing success of PDU session setup for a PDU session in which handover is being performed from the access network, the AMF may determine that the handover has ended successfully.

According to the disclosures of the present specification, even if handover between 3GPP access and non-3GPP access fails, the UE can ensure that the service is supported seamlessly.

Hereinafter, an apparatus to which the above disclosure of the present specification can be applied will be described.

Figure 14:
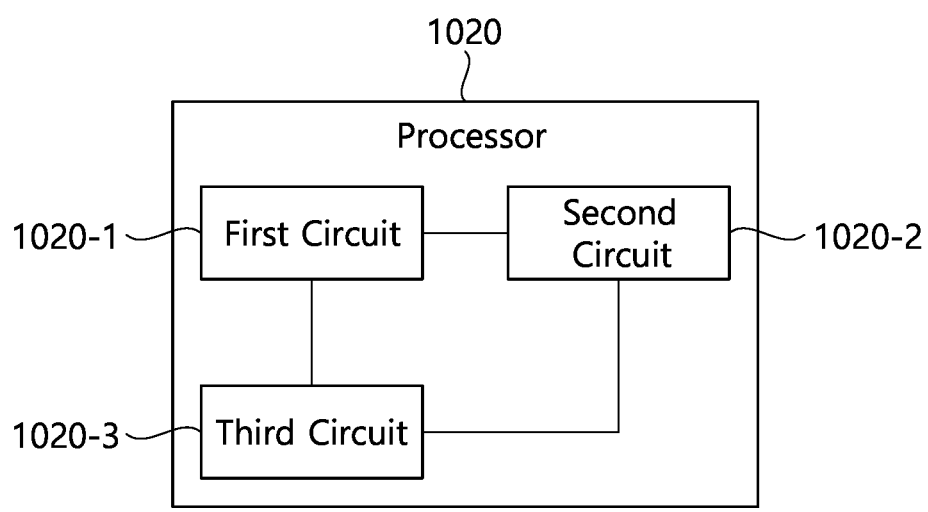
FIG. 14 shows a block diagram of a processor in which the disclosure of the present specification is implemented.

FIG. 14 shows a block diagram of a processor in which the disclosure of the present specification is implemented.

As can be seen with reference to FIG. 14, a processor 1020 in which the disclosure of the present specification is implemented may include a plurality of circuitry to implement the proposed functions, procedures and/or methods described herein. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an Application-Specific Integrated Circuit (ASIC) or an Application Processor (AP), and includes at least one of a Digital Signal Processor (DSP), a Central Processing Unit (CPU), and a Graphics Processing Unit (GPU).

The processor may be included in the UE, the base station, the AMF or the SMF.

A case in which the processor is included in the AMF will be described.

The first circuit 1020-1 of the processor included in the AMF may receive a Session Management (SM) context status notify message from a Session Management Function (SMF).

The SM context status notify message may be received based on a failure of a protocol data unit (PDU) session establishment procedure.

The PDU session establishment procedure may be triggered for handover of a PDU session between non-3rd Generation Partnership Project (non-3GPP) access and a 3GPP access.

The second circuit 1020-2 of the processor included in the AMF may update an access type related to the PDU session based on the SM context status notify message.

The third circuit 1020-3 of the processor included in the AMF may receive a PDU session establishment request message from a User Equipment (UE). The PDU session establishment request message may include a request type set to "Existing PDU Session".

The SM context status notify message may include information informing that the handover of the PDU session has failed.

The SM context status notify message may include information on the access type for the PDU session after a failure of the handover.

Updating the access type may be performed based on the information on the access type included in the SM context status notify message.

The information on the access type for the PDU session may indicate the non-3GPP access, based on the failure of the handover of the PDU session between the non-3GPP access and the 3GPP access.

The access type related to the PDU session may be updated to the non-3GPP access, based on the failure of handover of the PDU session between the non-3GPP access and the 3GPP access.

The fourth circuit (not shown) of the processor included in the AMF may not release the PDU session based on the failure of the PDU session establishment procedure.

The failure of the PDU session establishment procedure may be based on a resource setup failure of an Access Network (AN).

A case in which the processor is included in the SMF will be described.

The first circuit 1020-1 of the processor included in the SMF may transmit a Session Management (SM) context status notify message to an Access and mobility Management Function (AMF).

The SM context status notify message may be transmitted based on a failure of a Protocol Data Unit (PDU) session establishment procedure, The PDU session establishment procedure may be triggered for a handover of a PDU session between a non-3rd Generation Partnership Project (non-3GPP) access and a 3GPP access, and The SM context status notify message may include information on an access type related to the PDU session.

The SM context status notify message may include information informing that the handover of the PDU session has failed.

The SM context status notify message may include information on the access type for the PDU session after a failure of the handover.

The information on the access type for the PDU session may indicate the non-3GPP access, based on the failure of the handover of the PDU session between the non-3GPP access and the 3GPP access.

Figure 15:
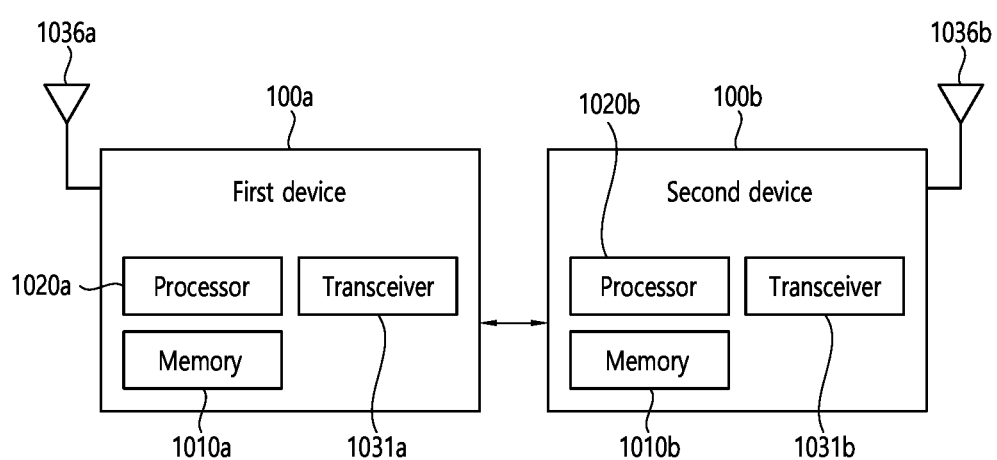
FIG. 15 illustrates a wireless communication system according to an embodiment.

FIG. 15 illustrates a wireless communication system according to an embodiment.

Referring to FIG. 15, the wireless communication system may include a first device 100a and a second device 100b.

The first device 100a may be a UE described in the disclosure of the present specification. Or, the first device 100a may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100b may be a network node (e.g., AMF or MME) described in the disclosure of the present specification. Or, the second device 100b may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 16:
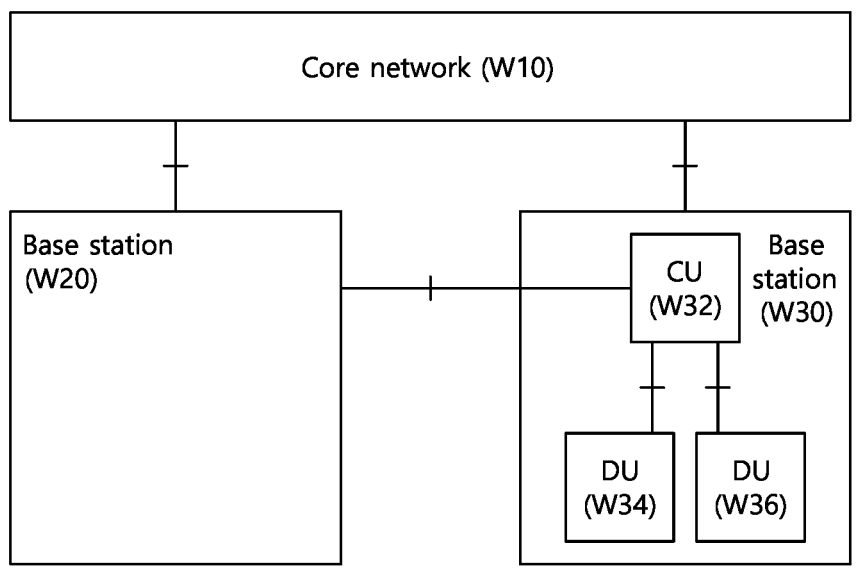
FIG. 16 illustrates a block diagram of a network node according to an embodiment.

FIG. 16 illustrates a block diagram of a network node according to an embodiment.

In particular, FIG. 16 is a diagram illustrating in detail a case in which a base station is divided into a Central Unit (CU) and a Distributed Unit (DU).

Referring to FIG. 16, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 17:
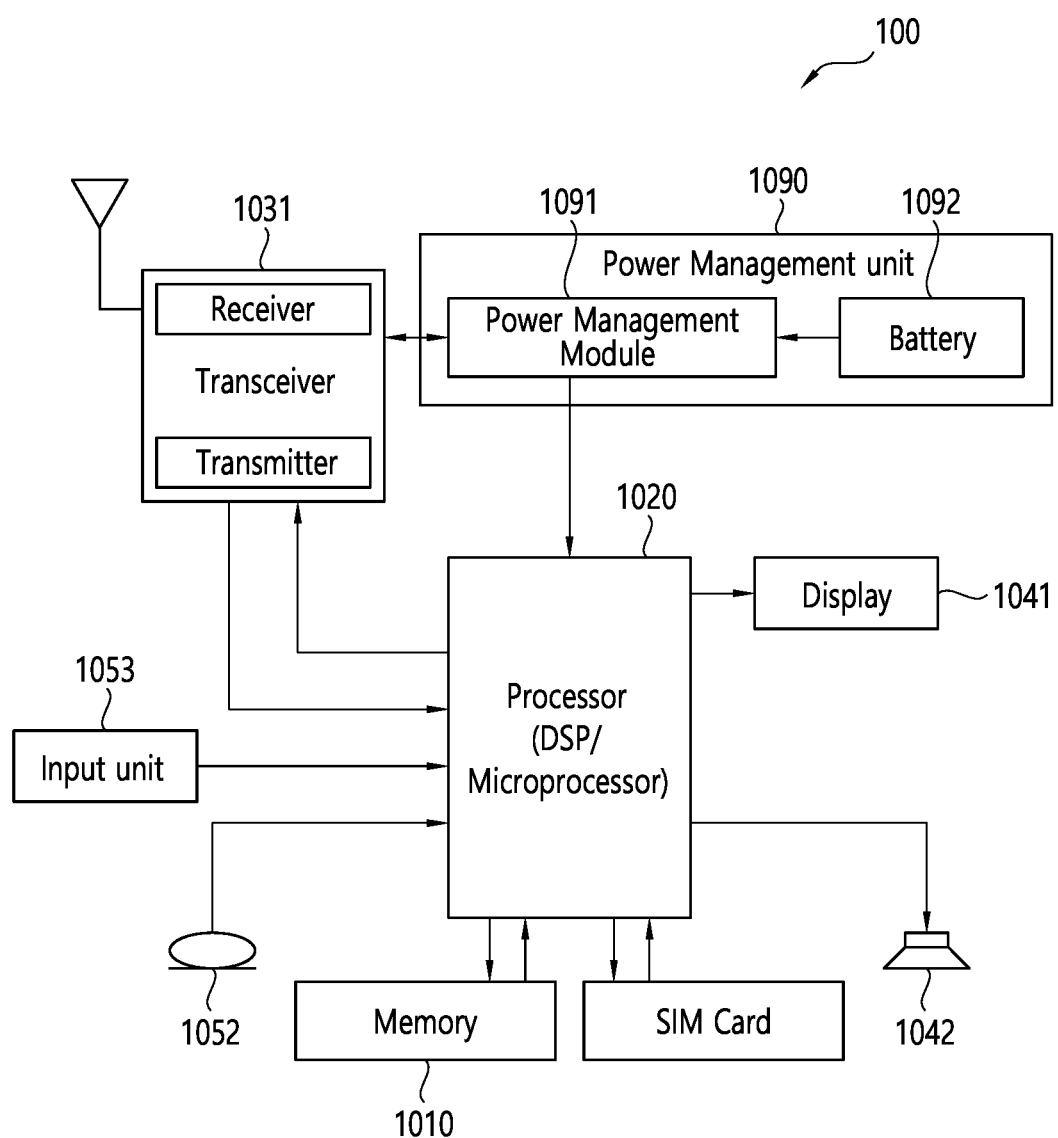
FIG. 17 is a block diagram illustrating a configuration of a UE according to an embodiment.

FIG. 17 is a block diagram illustrating a configuration of a UE according to an embodiment.

In particular, the UE 100 shown in FIG. 17 is a diagram illustrating the first device of FIG. 15 in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 18:
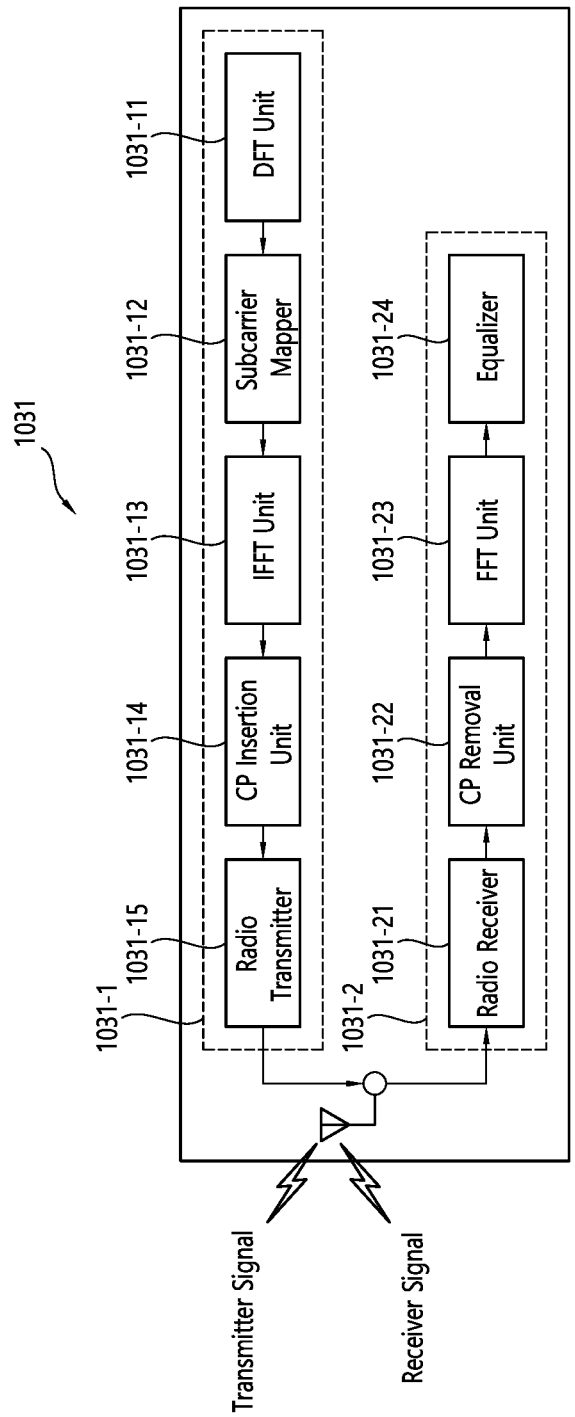
FIG. 18 is a detailed block diagram illustrating the transceiver of the first device shown in FIG. 15 or the transceiver of the device shown in FIG. 17 in detail.

FIG. 18 is a detailed block diagram illustrating the transceiver of the first device shown in FIG. 15 or the transceiver of the device shown in FIG. 17 in detail.

Referring to FIG. 18, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

Scenario to which the Disclosure of the Present Specification can be Applied

Although not limited thereto, various descriptions, functions, procedures, suggestions, methods and/or operational flowcharts of the disclosures of the present specification disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 19:
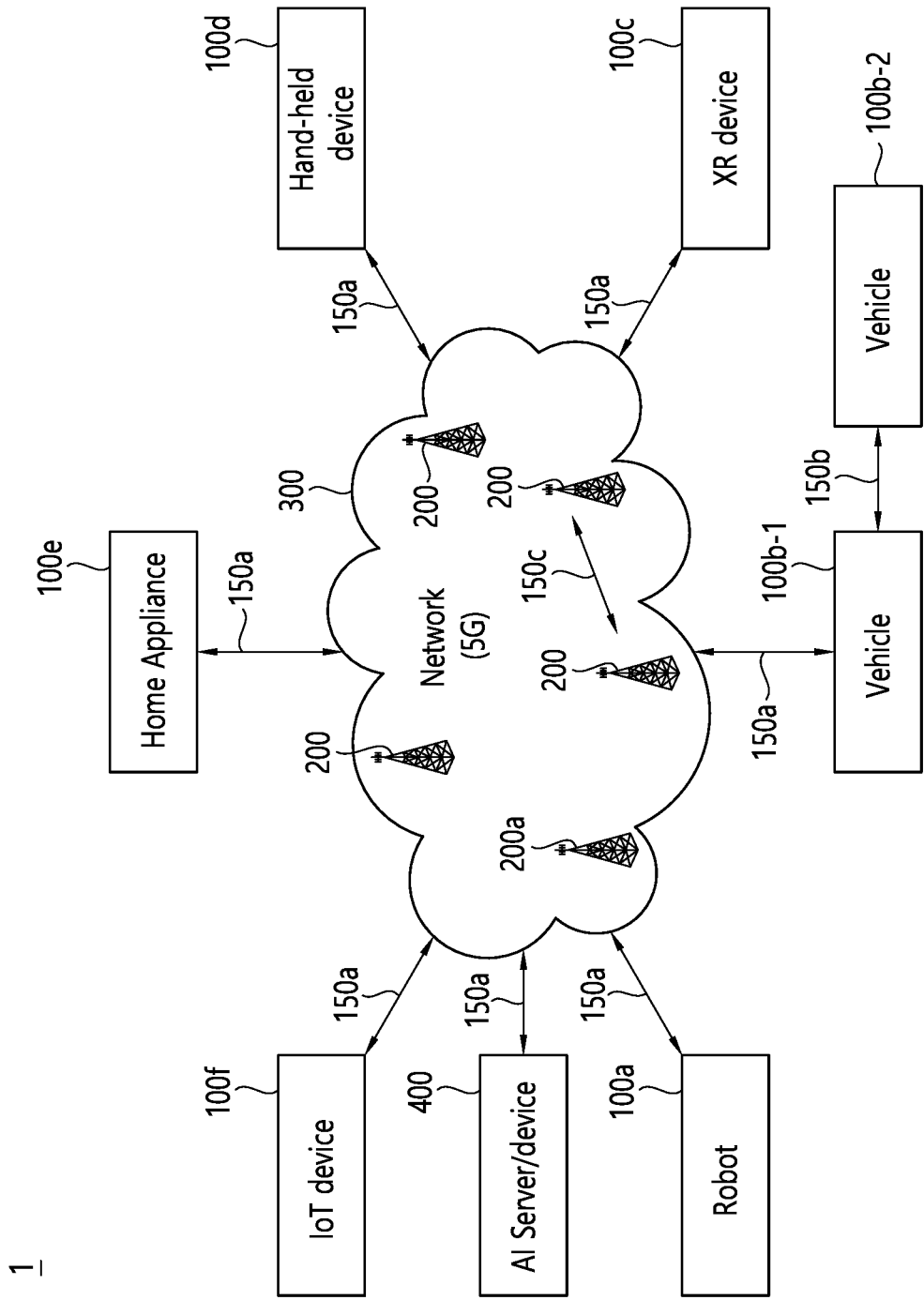
FIG. 19 illustrates a communication system 1 applied to the disclosure of the present specification.

FIG. 19 illustrates a communication system 1 applied to the disclosure of the present specification.

Referring to FIG. 19, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method for operating an Access and mobility Management Function (AMF), the method comprising:
   receiving, from a Session Management Function (SMF), a Session Management (SM) context status notify message,
   wherein the SM context status notify message is received based on a failure of a Protocol Data Unit (PDU) session establishment procedure,
   wherein the PDU session establishment procedure is triggered for a handover of a PDU session between a non-3rd Generation Partnership Project (non-3GPP) access and a 3GPP access; and
   updating an access type related to the PDU session based on the SM context status notify message.

2. The method of claim 1, wherein the method further comprises receiving, by the AMF, a PDU session establishment request message from a User Equipment (UE), and
   wherein the PDU session establishment request message includes a request type set to "Existing PDU Session".

3. The method of claim 1, wherein the SM context status notify message includes information informing that the handover of the PDU session has failed.

4. The method of claim 1, wherein the SM context status notify message includes information on the access type for the PDU session after a failure of the handover.

5. The method of claim 4, wherein updating the access type is performed based on the information on the access type included in the SM context status notify message.

6. The method of claim 5, wherein the information on the access type for the PDU session indicates the non-3GPP access, based on the failure of the handover of the PDU session between the non-3GPP access and the 3GPP access.

7. The method of claim 1, wherein the access type related to the PDU session is updated to the non-3GPP access, based on the failure of handover of the PDU session between the non-3GPP access and the 3GPP access.

8. The method of claim 1, wherein the method further comprises not releasing the PDU session based on the failure of the PDU session establishment procedure.

9. The method of claim 1, wherein the failure of the PDU session establishment procedure is based on a resource setup failure of an Access Network (AN).

10. A chipset mounted on an Access and mobility Management Function (AMF), the chipset comprising:
   at least one processor; and
   at least one memory for storing instructions and operably electrically connectable to the at least one processor,
      wherein the instructions, based on being executed by the at least one processor, perform operations comprising:
   receiving, from a Session Management Function (SMF), a Session Management (SM) context status notify message,
   wherein the SM context status notify message is received based on a failure of a Protocol Data Unit (PDU) session establishment procedure,
   wherein the PDU session establishment procedure is triggered for a handover of a PDU session between a non-3rd Generation Partnership Project (non-3GPP) access and a 3GPP access; and
   updating an access type related to the PDU session based on the SM context status notify message.

11. The chipset of claim 10, wherein the SM context status notify message includes information informing that the handover of the PDU session has failed.

12. The chipset of claim 10, wherein the SM context status notify message includes information on the access type for the PDU session after a failure of the handover.

13. A device for an Access and mobility Management Function (AMF), the device comprising:
   a transceiver;
   at least one processor; and
   at least one memory for storing instructions and operably electrically connectable to the at least one processor,
      wherein the instructions, based on being executed by the at least one processor, perform operations comprising:
   receiving, from a Session Management Function (SMF), a Session Management (SM) context status notify message,
   wherein the SM context status notify message is received based on a failure of a Protocol Data Unit (PDU) session establishment procedure,
   wherein the PDU session establishment procedure is triggered for a handover of a PDU session between a non-3rd Generation Partnership Project (non-3GPP) access and a 3GPP access; and
   updating an access type related to the PDU session based on the SM context status notify message.

* * * * *